United States Patent [19]
Miller et al.

[11] Patent Number: 6,073,484
[45] Date of Patent: *Jun. 13, 2000

[54] MICROFABRICATED TORSIONAL CANTILEVERS FOR SENSITIVE FORCE DETECTION

[75] Inventors: Scott A. Miller; Noel C. MacDonald; Yang Xu, all of Ithaca, N.Y.

[73] Assignee: Cornell Research Foundation, Inc., Ithaca, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/683,929

[22] Filed: Jul. 19, 1996

Related U.S. Application Data

[60] Provisional application No. 60/001,296, Jul. 20, 1995.

[51] Int. Cl.⁷ ..................................................... G01B 5/28

[52] U.S. Cl. ............................................................. 73/105

[58] Field of Search ................................ 73/105, 514.21, 73/514.23, 514.32, 514.36, 514.37; 250/306, 307

[56] References Cited

U.S. PATENT DOCUMENTS

| | | | |
|---|---|---|---|
| 4,483,194 | 11/1984 | Rudolf | ................................ 73/514.18 |
| 4,711,128 | 12/1987 | Boura . | |
| 4,736,629 | 4/1988 | Cole . | |
| 4,918,032 | 4/1990 | Jain et al. . | |
| 5,045,152 | 9/1991 | Sickafus . | |
| 5,211,051 | 5/1993 | Kaiser et al. . | |
| 5,228,341 | 7/1993 | Tsuchitani et al. . | |
| 5,249,465 | 10/1993 | Bennett et al. . | |
| 5,316,979 | 5/1994 | MacDonald et al. . | |
| 5,345,824 | 9/1994 | Sherman et al. . | |
| 5,444,244 | 8/1995 | Kirk et al. . | |
| 5,447,067 | 9/1995 | Biebl et al. . | |
| 5,537,863 | 7/1996 | Fujiu et al. . | |

FOREIGN PATENT DOCUMENTS

| | | |
|---|---|---|
| 0 480 471 A2 | 4/1992 | European Pat. Off. . |
| 0 567 938 A1 | 11/1993 | European Pat. Off. . |
| 0 665 590 A2 | 8/1995 | European Pat. Off. . |
| 0 703 429 A2 | 3/1996 | European Pat. Off. .................. 73/105 |
| 36 11 360 | 10/1987 | Germany . |
| 40 22 464 | 1/1992 | Germany . |
| 41 26 100 | 2/1993 | Germany . |
| 2101336 | 1/1983 | United Kingdom ................ 73/514.18 |
| WO 92/03740 | 3/1992 | WIPO . |

OTHER PUBLICATIONS

Stephen A. Joyce, et al., "A New Force Sensor Incorporating Force–Feedback Control for Interfacial Force Microscopy", Rev. Sci. Instrum. 62(3), Mar. 1991, pp. 710–715.

G.L. Miller, et al., "A Rocking Beam Electrostatic Balance for the Measurement of Small Forces", Rev. Sci. Instrum. 62(3), Mar. 1991, pp. 705–709.

D.A. Grigg, et al., "Rocking–Beam Force–Balance Approach to Atomic Force Microscopy", Ultramicroscopy 42–44 (1992), pp. 1504–1508.

J. Brugger et al., "Microlever With Combined Integrated Sensor/Actuator Functions for Scanning Force Microscopy", Sensors and Actuators A, 43 (1994), pp. 339–345.

William C. Tang et al., "Electrostatic Comb Drive Levitation and Control Method", J. of Micaroelect. Sys. vol. 1, No. 4, Dec. 1992, pp. 170–178.

(List continued on next page.)

*Primary Examiner*—Daniel S. Larkin
*Attorney, Agent, or Firm*—Jones, Tullar & Cooper, PC

[57] ABSTRACT

A torsional cantilever is microfabricated for reduced size to increase its resonance frequency, increase its scanning speed, and permit fabrication of large numbers in an array to provide parallel scanning. The cantilever may incorporate a tip for highly sensitive force detection. The device preferably includes a cantilever arm and a counterbalance mounted on opposite sides of a laterally extending torsional beam fixed at its outer ends. Sensors detect rotation of the cantilever arm and may provide control of sensor locator through a feedback loop.

35 Claims, 16 Drawing Sheets

OTHER PUBLICATIONS

Jesper Bay, et al., "Micromachined AFM Transducer with Differential Capacitive Read–out", J. Micromech. Microeng. 5 (1995), pp. 161–165.

Y. Xu, et al., "Integrated Micro–Scanning Tunneling Microscope", App. Phys. Lett. vol. 67, No. 16, Oct. 1995, pp. 2305–2307.

Toshihiro Itoh, et al., "Piezoelectric Cantilever Array for Multiprobe Scanning Force Microscopy", IEEE 0–7803–2985, Jun. 1996, pp. 451–455.

S.C. Minne, et al., "Parallel Atomic Force Microscopy Using Cantilevers with Integrated Piezoresistive Sensors and Integrated Piezoelectric Actuators", Appl. Phys. Lett. 67 (26), Dec. 1995, pp. 3918–3920.

Stemme, "Resonant Silicon Sensors", J. Micromech. Microeng., vol. 01, 1991, pp. 113–125.

Tortonese, Barrett, and Quate, Atomic resolution with an atomic force microscope using piezoresistive detection; Applied Phys. Lett., vol. 62, No. 8, Feb. 22, 1993, pp. 834–836.

Kong and Orr; Integrated electrostatically resonant scan tip for an atomic force microscope; J. Vac. Sci. Technol., B., vol. 11, No. 3, May/Jun. 1993, pp. 634–641.

Xu et al., "Microelectromechanical Scanning Tunneling Microscope", Transducers '95, The 8th International Conference on Solid–State Sensors and Actuators, and Eurosensors IX, Jun. 25–29, 1995, pp. 640–643.

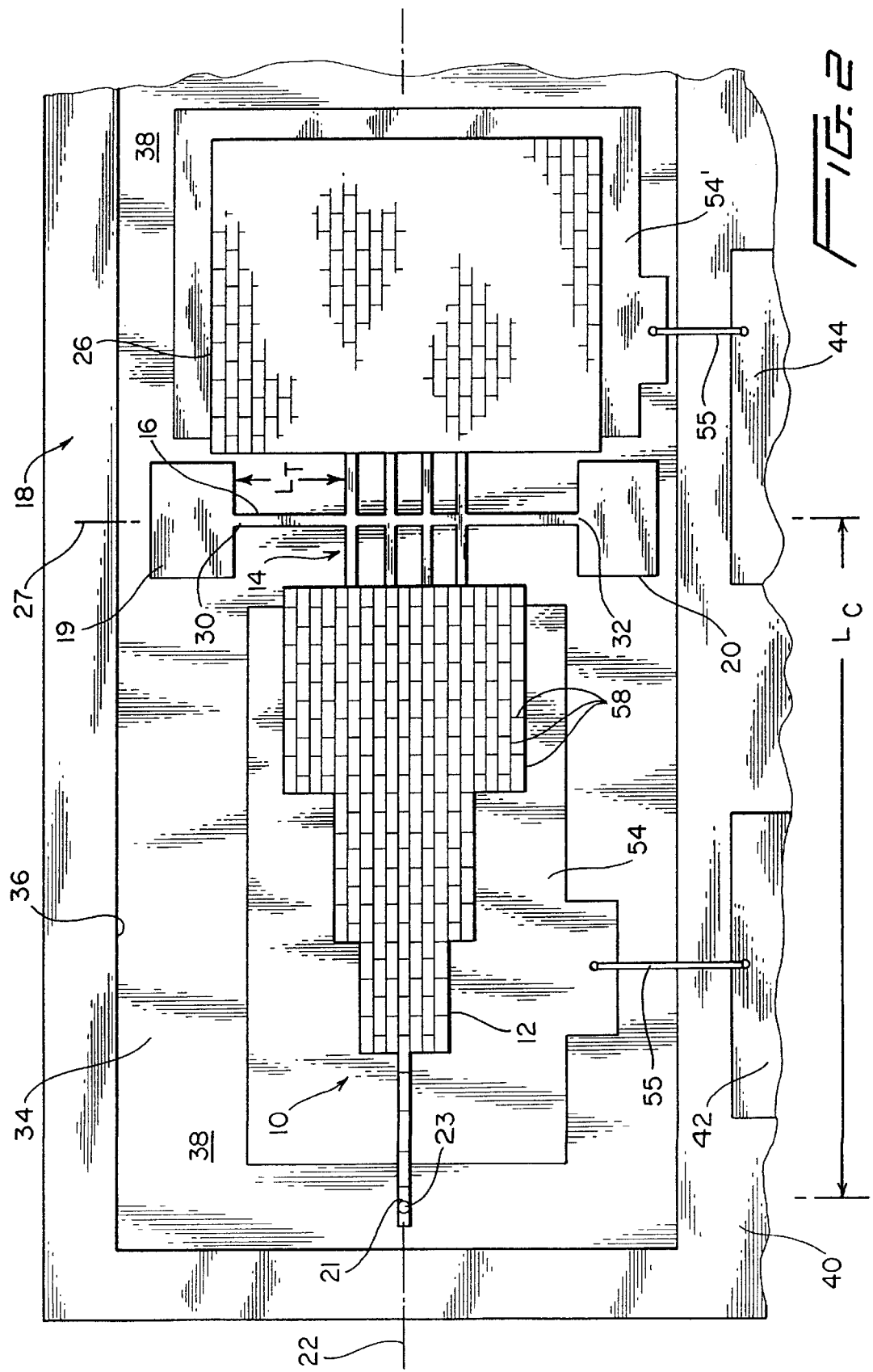

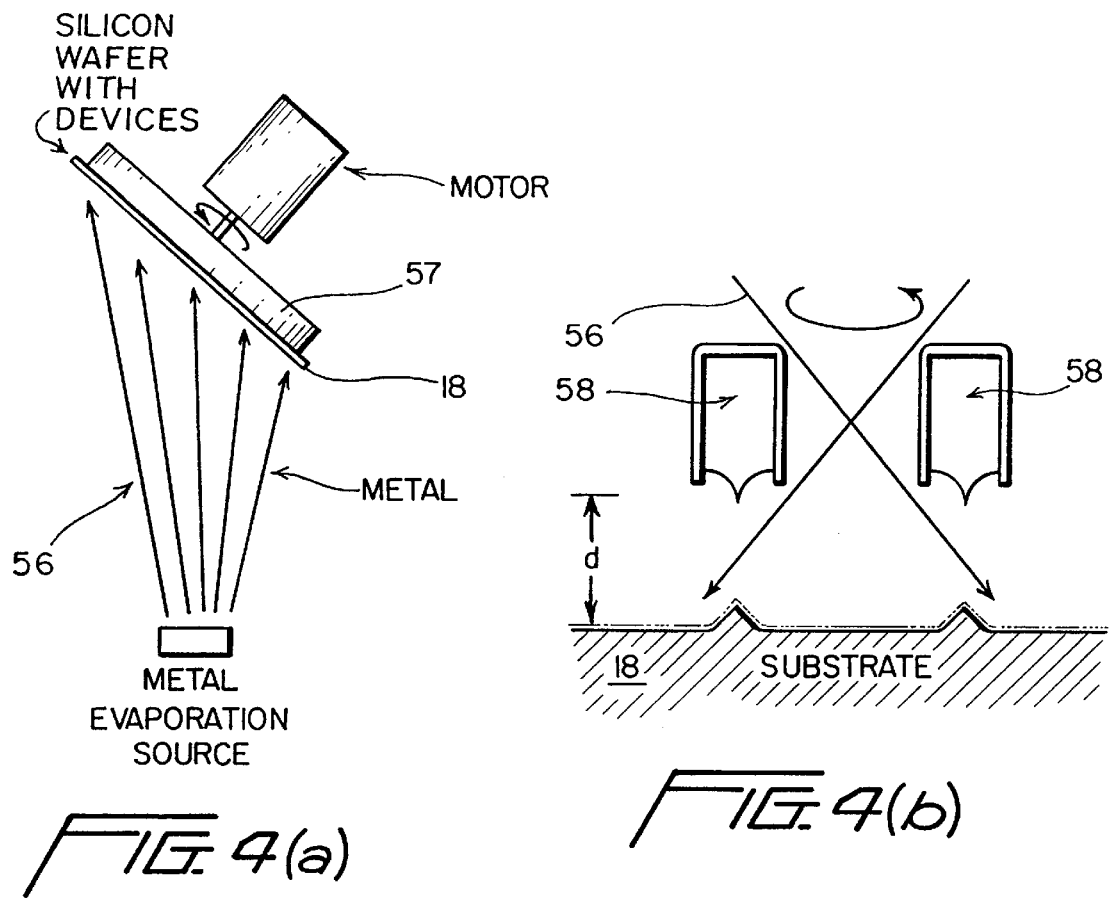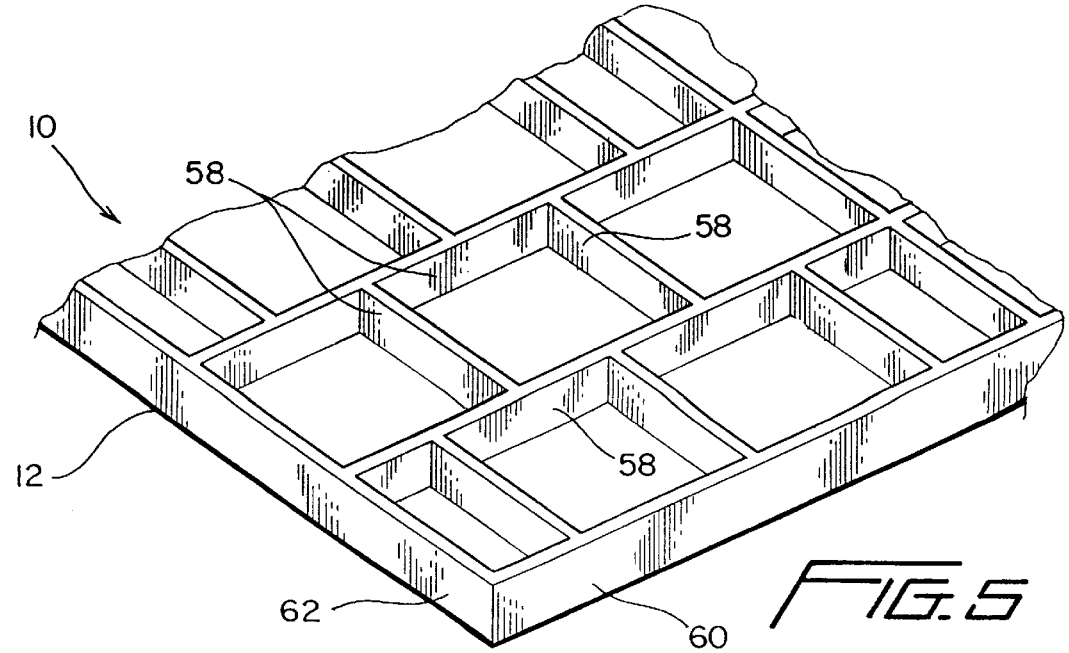

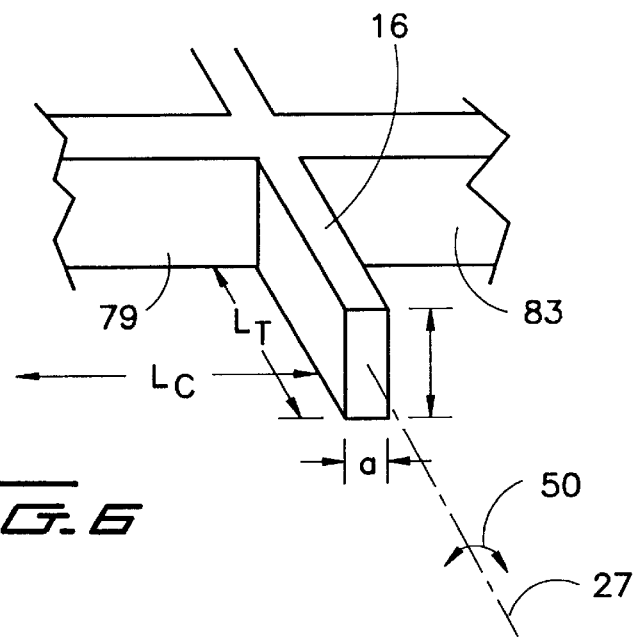
FIG. 6
FIG. 7
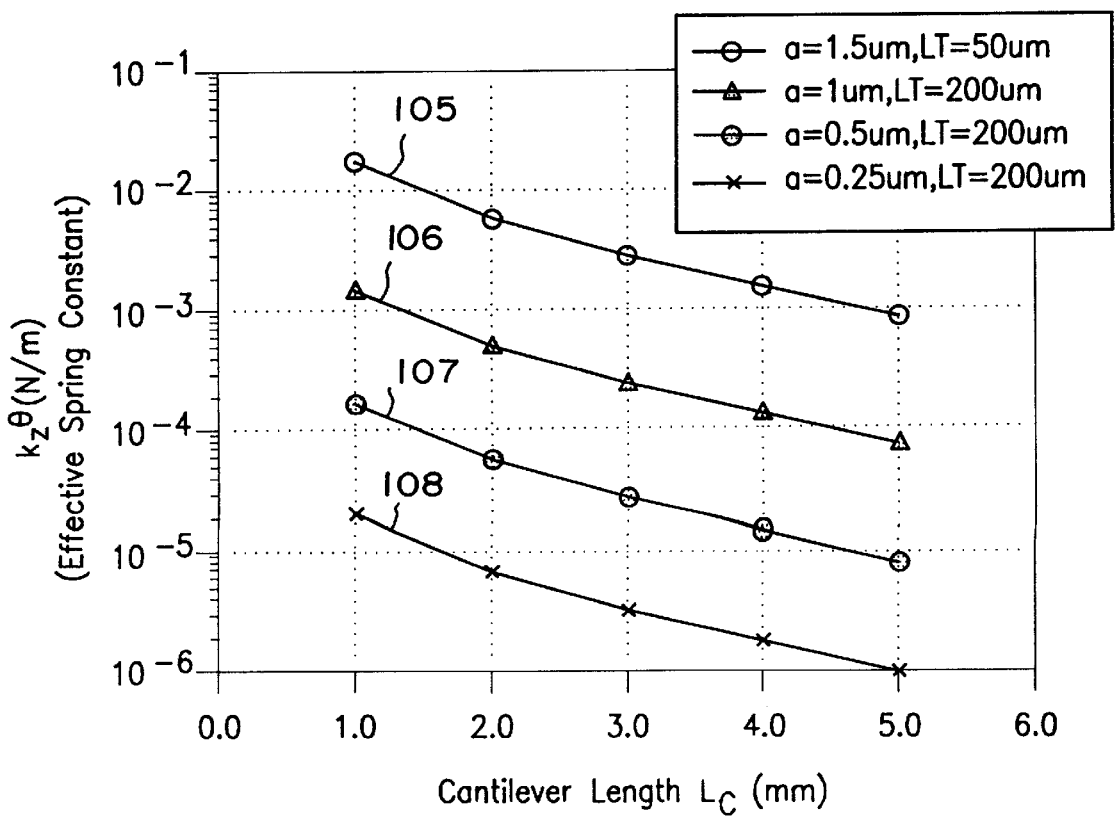

MICROFABRICATED TORSIONAL CANTILEVERS FOR SENSITIVE FORCE DETECTION

This application claims the benefit of U.S. Provisional Application No. 60/001,296, filed Jul. 20, 1995, the disclosure of which is incorporated herein by reference.

BACKGROUND OF THE INVENTION

The present invention relates, in general, to torsional cantilevers, and to methods for fabricating such cantilevers. More particularly, the invention relates to a high aspect ratio, single crystal silicon torsional cantilever having a cantilever moment arm mounted on a torsional support beam, to arrays of such cantilevers, and to a process for fabricating such a cantilever which is compatible with processes for making conventional silicon integrated circuits.

Since their development in the early 1980s, scanning probe microscopes have become important tools for surface analysis and surface modification. The unique applications of scanning probe microscopes include imaging and manipulating single atoms, measuring forces on the atomic scale, and performing nm-scale lithography. At the center of the family of scanning probe microscopes are the scanning tunnelling microscope (STM) and the atomic force microscope (AFM). These macroscopic scanned probe instruments, for the most part, use large piezoelectric actuators to position a sensing tip or a probe in three dimensions (xyz) and thus to provide relative motion between the tip and a sample surface. However, the size of these microscopic instruments limits their performance, for the mass of the tip-actuator structure produces low resonant frequencies and low scanning rates. More importantly, these large instruments cannot be easily integrated into arrays for high speed scanning and atom manipulation, for information storage, or for high throughput, nm-scale lithography systems.

A cantilever of some sort is often used in macroscopic force microscopy to monitor the variations in forces which represent the interaction between a tip and a sample. In such cases, the cantilever is usually a silicon nitride "V" cantilever which, for example, may be 0.6 to 2 micrometers thick, may be 100 to 200 micrometers long, and which may have a spring constant of between about 0.03 and 3 N/m for contact mode imaging. See, for example, T. R. Albrecht et al, J. Vac. Sci. Technol. A8, 3386 (1990). For non-contact mode imaging, the cantilever may be silicon with a spring constant of about 1 to 100 N/m, as described by Wolter et al, J. Vac. Sci. Technol. B9, 1353 (1991). In order to obtain a high degree of sensitivity, a low spring constant k and a high Q is needed for such cantilevers, and attempts have been made to accomplish this through the use of thin films. However, it is necessary to make the cantilever very thin in order to achieve a low spring constant with a thin film; for example, magnetic resonance force detection has been performed using a cantilever (without an integrated tip) that was only 900 Å thick, and which had a spring constant of $10^{-3}$ N/m. However, the fabrication and use of such thin cantilevers poses many problems, including the problem of tip integration, problems with internal stress, and problems in making electrical connections and in amplifying the resulting signals.

For many years, torsion has been used as a technique for highly sensitive measurements of force interactions; for example, measurement of Coulomb's torsional balance for electrostatic forces and Cavendish's balance for gravitation. Furthermore, torsional resonators have been used as high-Q resonators to study a variety of physical properties such as dissipation and visoelasticity. Such devices have been widely used because cantilevers, resonators or balances can be made symmetric with respect to their center of mass, with the result that lateral vibrations of the support do not couple to the torsional mode of the sensor device. In the case where the measuring device includes a spring, lateral modes of the spring can be made much stiffer than the torsional mode without affecting the torsional behavior, thus making torsional measurements desirable.

Torsional cantilevers are known to provide a viable option in scanning force microscopy. However, such cantilevers have, in the past, been assembled by hand, using cleaved pieces of silicon, carbon fibers or tungsten wire, and epoxy. Such devices did not incorporate integrated tips and, although microfabricated cantilevers have been demonstrated, such devices exhibited a lateral stiffness which was as soft as, or softer than that of a V-shaped cantilever. The lack of sufficient lateral stiffness can result in unwanted "stick-slip" behavior as the cantilever is scanned across samples.

SUMMARY OF THE INVENTION

The present invention is directed to an improved torsional cantilever which is microfabricated for reduced size to increase its resonant frequency and thereby increase its scanning speed, and to permit the fabrication of large numbers of devices in a unit area to provide parallel scanning of a surface. This microfabricated cantilever may incorporate an integrated tip so that it is particularly adapted to provide highly sensitive detection of forces. Further, the cantilever is integral with a substrate which may incorporate conventional integrated circuits to which the cantilever and/or tip may be electrically connected. In the preferred form of this invention, the substrate material is a single crystal silicon, and the cantilever structure preferably is fabricated as a microelectromechanical (MEM) device by the single crystal reactive etch and metalization (SCREAM-I) process described in copending U.S. patent application Ser. No. 08/312,797 filed Sep. 27, 1994, now U.S. Pat. No. 5,719,073 of Kevin A. Shaw, Z. Lisa Zhang and Noel C. MacDonald, the disclosure of which is hereby incorporated herein by reference (Docket No. CRF D-1307C). This fabrication process allows integration of the cantilever structure on a single crystal silicon substrate carrying pre-existing integrated circuits, and allows the cantilever to be formed with an integral submicron tip for use, for example, in scanning surfaces to be measured in scanning probe microscopy, or in other applications.

The process also permits incorporation of motion control devices such as capacitors in the cantilever device for producing and/or for controlling scanning motions in x, y, and z directions with respect to the axis of the cantilever, with such capacitors also being available to measure tip motion in response to forces to be detected. The process of the present invention also permits incorporation of other sensors, such as piezoresistive devices, diodes or transistors within the cantilever structure for use, for example, in detecting motion or in amplifying electrical currents detected by the tip. The integration of all of these features produces a scanning torsional cantilever that is extremely compact, which requires no external deflection sensor, and which is suitable for use in a variety of atmospheres and temperatures, as well as for use in dense array architectures of scanned probe instruments for information storage and molecular or atomic manipulation.

The torsional cantilever structure is a basic building block for micromechanical scanning probe microscopes, and can be fabricated with an integrated tip in a 100 µm×100 µm square area. The structure includes a torsional support beam which is secured at each of its ends to a substrate; preferably, the support beam is integrally formed with the substrate. A sensor arm, or cantilever moment arm, consisting of a rigid grid of single crystal silicon beams is microfabricated integrally with the support beam, and extends generally horizontally outwardly from the beam in cantilever fashion, the beam support and sensor arm lying in a horizontal x-y plane and perpendicular to each other. The outermost, or free end of the sensor arm carries a sensor tip which interacts with a sample to be measured.

The cantilever may be made to pivot about its support beam by electrodes fabricated on the substrate beneath the cantilever structure. Alternatively, the structure may incorporate interdigitated comb capacitor structures to provide controlled motion of the cantilever. This pivotal motion of the cantilever about the torsional support beam provides the out-of-plane motion required to enable the tip to track a surface. If desired, a small xy scanner may be integrated into the cantilever structure for precise lateral positioning of the tip. Forces applied to the tip, for example in the vertical (z) direction, deflect the tip, and this motion is transferred by the sensor arm to the support beam in the form of a torsional force applied about the horizontal axis of the support beam. The torsional force applied to the support beam by the cantilever moment arm can be measured in a variety of ways to provide an accurate measure of the tip force. For example, the relative motion of interdigitated capacitor plates, or the motion of the cantilever with respect to an underlying electrode can be measured as a change in capacitance. Deflection can also be measured by a piezoresistor produced in the support beam, as by implanting an n-type region into a p-type substrate or implanting a p-type region into an n-type substrate. The doped region forms a resistance which changes due to stress produced in the support beam by relative rotation of the torsion arm.

The measurement of rotation can also be accomplished by another stress-sensitive device based on the piezojunction effect. In this case, a sensor diode is formed by implanting an n-type region in the p-type substrate silicon at the junction of the torsional support beam with a fixed mesa on which the beam is mounted. Contacts are made to this implanted region and to the adjacent substrate. Stress in the support beam causes a change in current through this diode, and changes in the current can be measured.

The cantilever moment arm structure of the invention can be utilized whenever out-of-plane or rotational actuators or force sensors are required. Such an actuator may be used, for example, in an accelerometer, wherein an asymmetric design, with more mass on one side of the support beam than on the other, provides a device which will be sensitive to acceleration in directions out of the plane of the cantilever and the substrate on which it is mounted. The actuator can also be used in force microscopy employing a symmetric design which balances the applied force so that the device will be highly sensitive to changes in a force acting on one side of the cantilever, and not on the other.

By integrating a tip on the free end of the cantilever moment arm in a microscope, the torsional cantilever becomes a tip-to-surface force center in a scanning force microscope. The out-of-plane motion, or torsional cantilever motion (in the z direction), also enables the tip to track surface topography. If desired, the cantilever may carry a mirror or an interferometer to provide accurate measurement of out-of-plane or rotational motion, or one or more of the sensors described above can measure and/or control this motion.

With the torsional cantilever beam established as a building block, an array of beams can be fabricated, wherein cantilevers can be provided at 100 µm intervals to provide, for example, a 10×10 array of cantilevers in a 1 mm by 1 mm square area. Such an array allows an entire 1 mm by 1 mm sample to be scanned for imaging or manipulation by moving the support mechanism only 100 µm in x and y directions.

The array can be made in several configurations. For example, torsional cantilevers can be made individually movable in the z direction while the sample is scanned in x and y directions. Alternatively, the cantilevers can be fabricated to be movable in the z direction as part of a micromechanical structure that is scannable in the x direction, with the sample being scannable in the y direction. In another configuration, the z cantilevers can be fabricated as part of a micromechanical stage that is scannable in x and y directions, with the sample remaining stationary. The sample can be a chip with a bare surface or a compliant surface, or can be an active MEM device. Alternatively, the sample can be placed on or bonded to a chip which carries an array of microscanned probe devices, wherein the torsional cantilever elements which make up the probe provide enough out-of-plane (or z-direction) motion to allow the tips to contact the surface. To facilitate this, sample support pillars or posts are fabricated on the chip which carries the array, with the pillars having the same height as, or being a little taller than, the tips.

A large number of electrical connections are required in an array of cantilevers to carry control signals for individually moving the cantilever arms or for carrying sensor output signals from each arm. Transistors for switching among various devices can reduce the number of connections, and such switches can be in the form of normal planar IC transistors fabricated on the silicon substrate. Metal pathways along the substrate provide the necessary connections. Suspended transistors in the silicon beams can also be used for switching, amplification, and logic, and electrical isolation can be provided by oxide segments in the beams.

The cantilevered arms and arrays of such arms can be used in a wide range of applications. In addition to scanning of images and the manipulation of surfaces at atomic and near-atomic scales, the devices and arrays of the invention can be used for high density information storage, in the range of a terabit per $cm^2$, for molecular manipulation instruments, for field emission (e-beam) instruments, and for microlithographic or micromachining tools.

BRIEF DESCRIPTION OF THE DRAWINGS

The foregoing, and additional objects, features and advantages of the present invention will become apparent to those of skill in the art from the following detailed description of preferred embodiments thereof, taken in conjunction with the accompanying drawings, in which:

FIG. 2 is a top plan view of the cantilever device of FIG. 1;

FIGS. 4(a) and 4(b) are diagrammatic illustrations of a metallization process used in the device of FIG. 1;

FIG. 5 is a partial, enlarged view of the cantilever structure of FIGS. 1 and 2;

FIG. 6 is an enlarged, partial view of the torsional support beam for the device of FIG. 1;

FIG. 7 is a graphical illustration of curves representing the relationship of effective spring constant to cantilever length for different cantilever cross-sectional widths "a" each having a cantilever cross-sectional height "b" of 10 µm;

DESCRIPTION OF PREFERRED EMBODIMENTS

Figure 1:
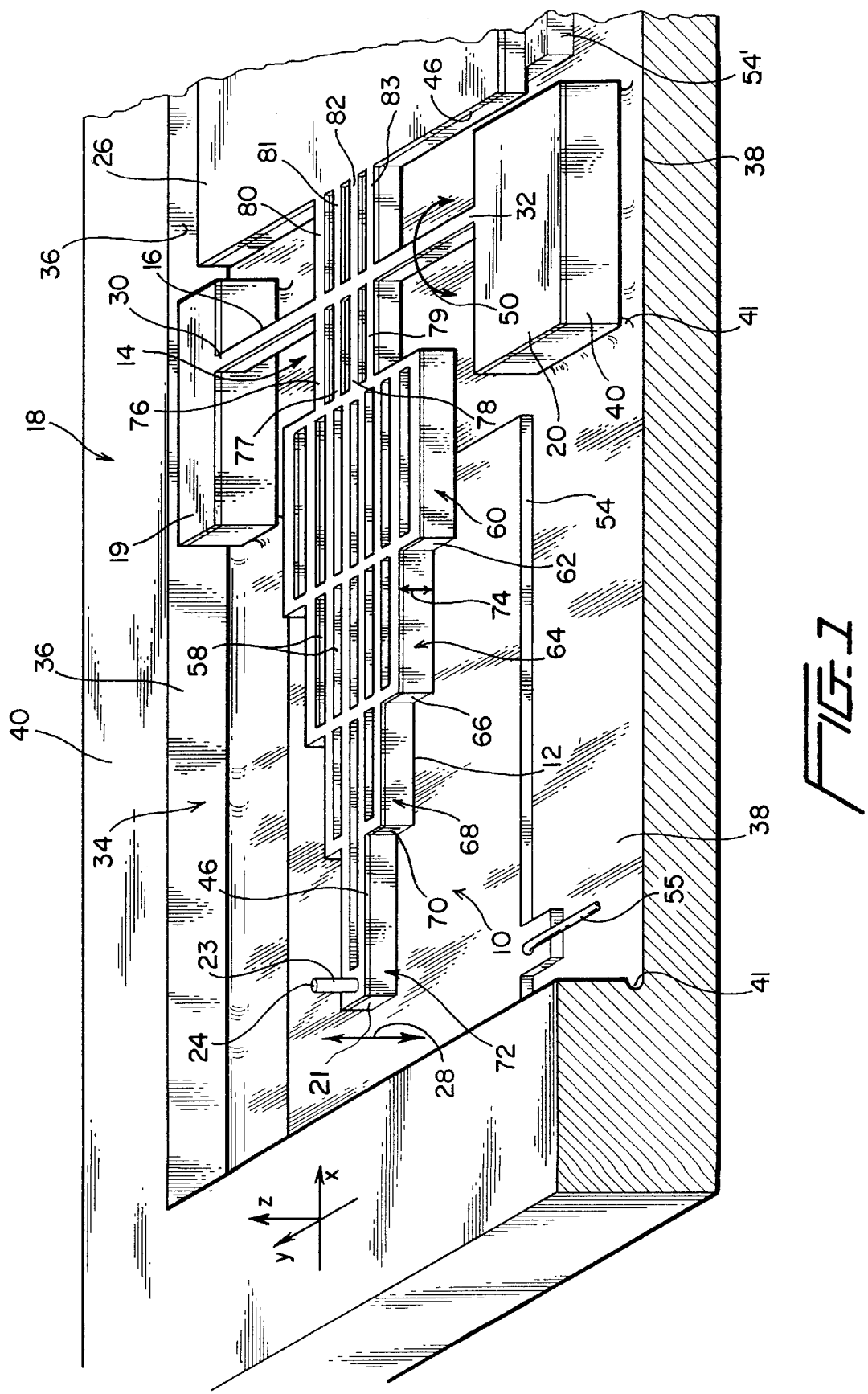
FIG. 1 is a partial perspective view in diagrammatic form of a torsional cantilever device in accordance with the present invention.

Turning now to a more detailed consideration of the present invention, there is illustrated in FIG. 1 a perspective view of a microfabricated, highly sensitive force detecting torsional cantilever device 10 incorporating an elongated torsionally-mounted microelectromechanical (MEM) cantilever moment arm generally indicated at 12. This device has a wide range of applications, but will be described herein for convenience as being used as a force sensor in scanning probe microscopy. The cantilever moment arm portion 12 is mounted at a first, or near end 14 to the center of a laterally extending torsional support beam 16. In the illustrated embodiment, the opposite ends of the beam 16 are supported on, and preferably are integral with, a substrate 18 as at support mesas 19 and 20. The arm 12 is integral with beam 16 and in its preferred form is formed of a grid of longitudinal and lateral beams, as illustrated in FIG. 1, the arm extending from its near end 14 generally horizontally forwardly from the mounting beam 16 to a far, or distal, end 21 along a longitudinal axis 22 (FIG. 2) which is perpendicular to beam 16. An upwardly-extending, generally vertical, nanometer-scale sensing tip 23 is formed on the distal end 21 of the cantilever moment arm in the preferred form of the invention. This sensing tip is generally conical, tapering upwardly and inwardly to an extremely small diameter, on the order of one atom, at its end 24. The arm 12 and beam 16 lie in an x-y plane, with tip 22 extending perpendicularly to the plane, in a z direction.

Also mounted on lateral support beam 16, but on the opposite side thereof from arm 12, is a counterweight 26 which is also fabricated as a grid of longitudinal and lateral beams (not shown in FIG. 1), and which is of sufficient size and weight to produce a counterbalancing mass for the cantilever arm so as to make the arm more sensitive to, and responsive to, forces applied to tip 23. The counterweight 26 serves as an extension of cantilever moment arm 12 so that arm 12 and counterweight 26 rotate together about a lateral axis 27 of the beam 16. Axis 27 lies in the x-y plane of arm 12 and beam 16, with axis 27 being perpendicular to the longitudinal axis 22 of arm 12. Rotation of arm 12 and weight 26 occurs upon application of vertical forces in the direction of arrow 28 in FIG. 1; that is, upon application of forces in the z direction to the tip 23.

The torsional cantilever device 10, which includes the moment arm 12, the lateral torsional mounting beam 16, the tip 23 and the counterweight 26, is fabricated by the SCREAM-I process described in the aforesaid U.S. application Ser. No. 08/312,797, now U.S. Pat. No. 5,719,073 discussed above. This process includes a reactive ion etching process for fabricating suspended, released, single crystal silicon microelectromechanical (MEM) structures, with feature dimensions as small as 250 nm and with arbitrary structure orientation, from the single crystal silicon wafer or substrate 18. During the fabrication process, the torsional cantilever structure 10 is released from the underlying substrate so that it is mechanically spaced from, is supported over, and is generally parallel to, the underlying substrate. The cantilever structure 10 is connected to the substrate only at support regions 30 and 32, where the lateral beam 16 intersects and is integral with mesas 19 and 20 formed during the fabrication process, or is integral with the sidewalls of a cavity formed in the substrate 18. The cantilever device 10 is conveniently referred to as a released structure.

During the SCREAM-I fabrication process, the beams which make up arm 12, beam 16, and counterweight 26 are lithographically defined in a single etch mask and the regions surrounding the defined structure are removed from the substrate by reactive ion etching (RIE) to form surrounding trenches which together produce a cavity 34 having vertical walls 36 in the substrate 18. The cavity also surrounds the support mesas 19 and 20 which are formed in the substrate, as illustrated. Thereafter, a second RIE step undercuts and releases the defined structure and in addition undercuts the support mesas and surrounding substrate mesa. The cavity 34 thus incorporates a generally vertical side wall 36, which surrounds the cavity 34 in which cantilever device 10 is located and a floor 38 which underlies the cantilever and which preferably lies in a horizontal (x-y) plane below and substantially parallel to the cantilever 10. The side wall 36 surrounding the cavity 34 defines not only the support mesas 19 and 20, but also a substrate mesa region illustrated at 40 in FIG. 1. The side wall 36, as well as the walls of the mesas 19 and 20, are undercut, as illustrated at 41, during the release step. The substrate mesa region 40 may incorporate one or more integrated circuits, such as those generally indicated at 42 and 44 in FIG. 2, which may be fabricated in conventional manner prior to the formation of the cantilever 10.

In the SCREAM-1 process, a metal layer 46 may be deposited on the released structure and the surrounding substrate. This metal layer is discontinuous at the trenches to separate the metal on the released elements from the metal on the substrate both mechanically and electrically. Furthermore, the undercut portions 41 prevent metal deposited on the floor of the cavity from being electrically connected to the metal on the mesas.

The SCREAM-I process is a low temperature process which is compatible with conventional integrated circuit processes, and thus with preexisting integrated circuits on the substrate. Thus, a substrate, or wafer, may first be processed in conventional manner to first provide integrated circuits which are to be used to control or to sense a cantilever sensor structure. A space is left on the wafer for subsequent fabrication of the microelectromechanical structure of the present invention by the SCREAM-I process. This process will not damage the integrated circuits, and the SCREAM-I process provides suitable metalization to permit selected electrical interconnection between the cantilever structure and the preexisting integrated circuits.

Figure 3A:
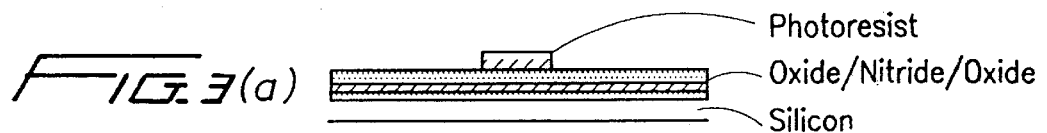
FIGS. 3(a) through 3(h) illustrate a process for fabricating sensor tips on the device of FIG. 1.
Figure 3B:
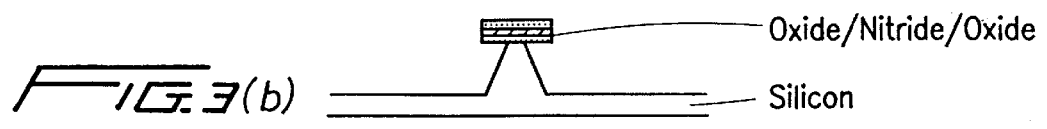
Figure 3C:
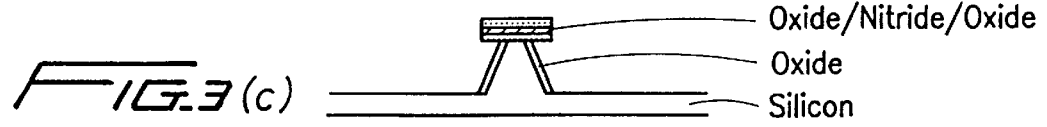

In the preferred form of the invention, the cantilever arm 12 is provided with a high aspect ratio sensor tip 23 which is formed before the above-described cantilever fabrication steps. In one process for making the tip illustrated in FIGS. 3(a)–3(b), an n-type, P-doped, 18–40 ohm-cm, (100) oriented single crystal silicon substrate is subjected to ion implantation by an As dose of $5 \times 10^{14}/cm^2$ at 30 keV to form an $n^+$ layer. A dielectric stack consisting of a 20 nm layer of thermal oxide, a 150 nm layer of LPCVD nitride and a 600 nm layer of PECVD oxide is formed on the top surface of the substrate, as illustrated in FIG. 3(a), and a 700 nm film of KTI-OCG photoresist is patterned and exposed in a GCA 4800 DSW wafer stepper, to produce a resist pattern (FIG. 3(a)). The resist pattern is transferred to the dielectric stack by a $CHF_3$ reactive ion etch (RIE) to produce a dielectric mask, as illustrated in FIG. 3(b). An $SF_6$ RIE etch then produces a silicon cone under the dielectric mask. In one example, a 4 sccm $SF_6$/2 sccm $O_2$ etch in a chamber having a pressure of 5 mTorr and under a DC bias of –300 V with an etch time of 5 minutes produced a 1.5 µm high circular cone underneath a 600 nm diameter dielectric mask. A 100 nm silicon dioxide layer is then thermally grown on the exposed silicon surface (FIG. 3(c)).

Figure 3D:
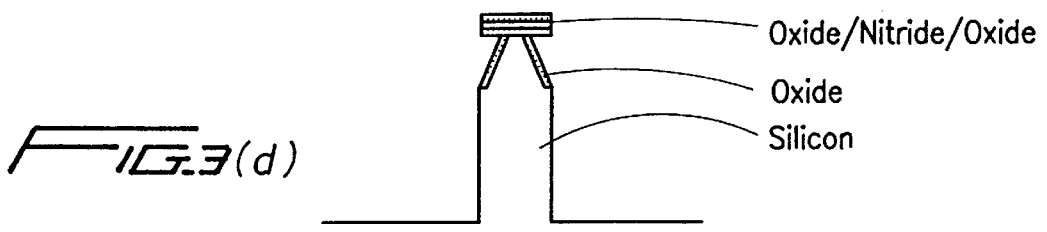
Figure 3E:
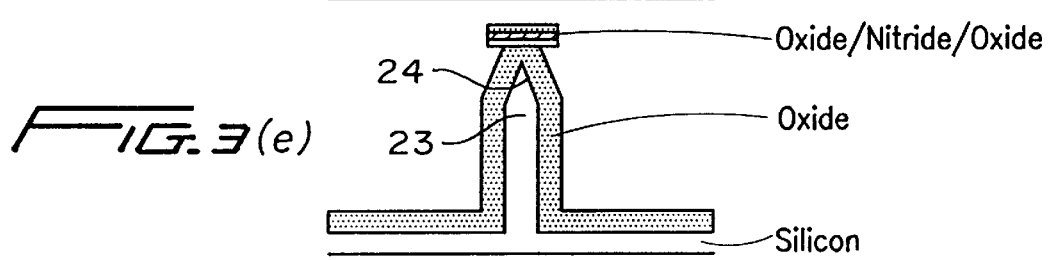
Figure 3F:
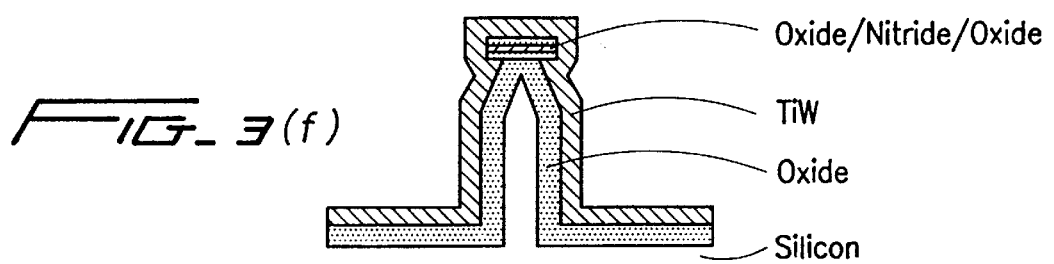
Figure 3G:
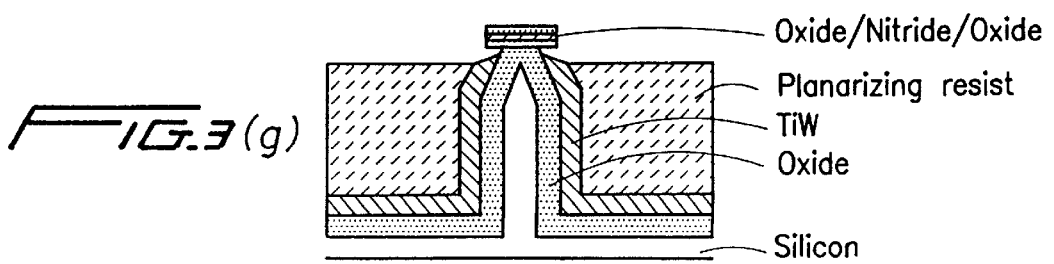
Figure 3H:
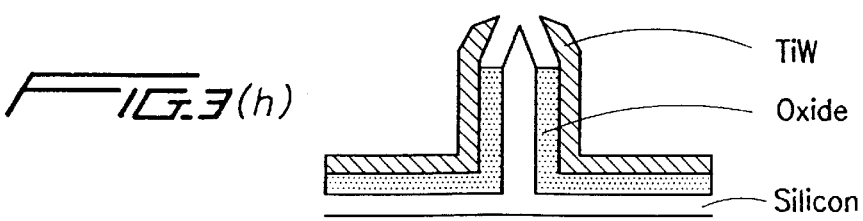

The foregoing was followed by a $CHF_3$-RIE to etch any oxide on the horizontal surfaces (see FIG. 3 (c)), and a $Cl_2$-RIE vertical etch produced a high aspect ratio (height to diameter ratio of at least about 10 to 1) silicon post, as illustrated in FIG. 3(d). This etch utilized a 50 sccm $Cl_2$/2 sccm $BCl_3$ etch at a chamber pressure of 20 mTorr and a DC bias of –400 V. Thereafter, thermal oxidation was used to sharpen the tip (FIG. 3 (e)). A typical sensor tip may have a height of about 10–20 µm, a diameter of about 1 µm, and a tip radius of about 10 nm.

If the tip is to be used as a force sensor or for similar purposes, the foregoing steps are followed by the above-described SCREAM process to fabricate the cantilever 10. However, in some cases it is desirable to utilize the tip as a field emitter, in which case a self-aligned electrode is formed in accordance with FIGS. 4(f) through 4(h). In this procedure, a metal contact window is opened through the oxide layer, followed by an As implant at 30 keV, $5 \times 10^{15}/cm^2$, and annealing at 1000° C. for 30 sec. Thereafter, a sputter deposition of TiW covers the surface of the substrate and the tip (FIG. 3(f)). A planarizing layer of KTI-OCG is spun on and baked at 90° C. (FIG. 3(g)), and an $O_2$ plasma etch removes the photoresist until the TiW above the apex of the tip is exposed (FIG. 3(g)). Finally, an $SF_6$-RIE etch of the TiW layer exposes the end of tip 23, with the tip being surrounded by a closely-spaced TiW electrode. Thereafter, the SCREAM-1 process is used to fabricate the cantilever 10.

The forces which are to be detected by the torsional cantilever 10 produce motion in the z-direction, as noted above, which is translated by tip 23 and moment arm 12 into a torsional motion about the lateral axis of rotation 27 corresponding to the lateral torsional beam 16. Vertical motion of tip 23 thus produces a torsional force on beam 16 in the direction of arrow 50 (FIG. 1), and this motion can be measured by a suitable sensor or sensors such as a plate capacitor, multiple comb capacitors, piezoresistors, or devices such as transistors or diodes. For example, a capacitor for sensing vertical motion of arm 12 may be provided by formation of a metal electrode 54 on the floor 38 of the cavity 34 below arm 12, as well as an electrode 54' on the floor of the cavity under the 24 counterweight 26. These electrodes may be part of the metal layer 46 deposited on the device during the SCREAM process described above, but are electrically isolated from the metal on the arm 12 and counterweight 26, as described above. The electrodes 54, 54' and layer 46 form opposed, spaced capacitive plates which are connected through metal connectors formed by patterning the metal layer or are connected by wires such as wires 55 bonded to the electrode and to circuits such as circuits 42 or 44.

The capacitance between the metal layer 46 on moment arm 12 and underlying metal layer 54 and the capacitance between the metal layer 46 on counterweight 26 and the underlying metal layer 54' varies in opposite directions as the arm and the counterweight rotate about beam 16 upon the application of a force to tip 23. The rotation of moment arm 12 thus produces a differential change in capacitance which can be measured with great accuracy to provide a highly sensitive detection of the relative motion between arm 10 and the substrate 18.

The metal capacitor electrodes 54 and 54' preferably are fabricated by sputtering metal such as aluminum onto the substrate 18 containing the released torsional cantilever structured, and then evaporating aluminum, at an angle sufficient to provide metal coverage under the beams as at 56 in FIGS. 4(a) and 4(b), utilizing a rotating stage 57. FIG. 4(b) is an enlarged partial view of the substrate, illustrating how the metal 56 passes suspended elements such as individual beams 58 making up the cantilever structure. The metal is then patterned using conventional photolithography and reactive ion etching to shape the electrodes and to provide surface electrical connections or connector pads for interconnecting the electrodes and adjacent circuitry.

In place of the capacitive electrodes 54 and 54' capacitive comb-type elements may be provided between the released torsional cantilever structure and the substrate to sense or to produce vertical motion of the cantilever. Such comb-type sensors or drives may incorporate partially oxidized silicon beams fabricated by the process described in copending U.S. patent application Ser. No. 08/383,524 of Noel C. MacDonald and Ali Jazairy, filed Feb. 3, 1995, and entitled "Masking Process for Fabricating Ultra-High Aspect Ratio, Wafer-Free, Micro-Opto-Electromechanical Structures" (CRF D-1689), the disclosure of which is hereby incorporated herein by reference.

In the embodiment of the invention illustrated in FIGS. 1 and 2, the arm 12 has a stepped shape of decreasing width and is made up of a grid of individual longitudinal and lateral beams 58 having high aspect ratios to provide the desired rigidity, and thus the high spring constant, needed to provide the desired accuracy of measurement of applied forces at tip 23. Near the base 14 of the arm 12, the arm is formed with a relatively wide region 60 which steps down at shoulder 62 to a second, slightly narrower region 64. This, in turn, steps down at shoulder 66 to a still narrower region 68 and again steps down at shoulder 70 to the narrowest region 72 on which the tip 23 is mounted. The stepped, elongated shape gives lateral stability to the sensing arm 12 (in the x-y plane) so that it is relatively unaffected by lateral vibrations. The height of each segment, indicated by arrow 74, is sufficient to provide vertical rigidity, and to provide a relatively large height to width ratio, or aspect ratio, for the structure. It will be apparent, of course, that numerous variations of this shape may be used while still providing the desired stability and rigidity for the arm.

In the preferred embodiment, the arm 12 is secured to the torsional beam 16 by a plurality of longitudinally extending connector beams 76, 77, 78, and 79. These connector beams are formed integrally with the arm 12 and with the torsional beam 16, and have substantially the same height 74 as the arm 12 so as to maintain vertical rigidity and high spring constant. Each of the connector beams 76–79 preferably is thin, for light weight, with a cross-section having a high aspect ratio; that is, an aspect ratio of about 10 or 20 to 1.

Also, in the illustrated embodiment of the invention the counterweight 26 is fabricated as a generally rectangular structure having a height approximately equal to the dimension 74 and having an axial length along axis 21 and a lateral width parallel to axis 27 sufficient to provide a mass which will counter-balance the mass of the arm 12. The counterweight 26 is mounted on arm 16 by connector beams 80–83 which are mounted on, and which preferably are integral with, the transverse cantilever beam 16, as well as being integral with the counterweight 26. The beams 80–83 are similar to and correspond to beams 76–79, and thus have relatively high aspect ratios to provide the required stability for the counterweight 26 and to provide a high spring constant mounting for the counterweight which will permit accurate measurement of forces applied to tip 22.

Although the metal layer 46 applied to the surface of the cantilever 10 is illustrated in FIG. 1 as a solid covering for the arm and counterweight structure, a preferred form of the invention is illustrated in FIGS. 2 and 5. As diagrammatically illustrated in FIG. 2, and as best seen in FIG. 5, the moment arm 12 and the counterweight 26 are formed as an open grid or lattice work of thin, high aspect ratio beam segments, such as the segments 58 illustrated in an enlarged view in FIG. 5. Only a small number of such beam segments are illustrated in FIG. 1 for clarity; however, as diagrammatically illustrated in FIG. 2, the cantilever structure 10 preferably is made up of a large number of closely spaced beam segments. The entire structure of cantilever moment arm 12, torsional support beam 16, counterweight 26, and connector beams 76–83 is fabricated from single crystal silicon using the SCREAM-I process. Each beam segment thus has a high aspect ratio on the order of about 10 to 1, with the segments being released from, and spaced from, the underlying substrate floor 38 and spaced from the side walls 36. The ends of beam 16 are mounted to mesas 19 and 20 at connecting regions 30 and 32, where the lateral torsional support beam 16 is integral with the substrate to support the cantilever structure 10. The thin, tall segments provide a high spring constant and high rigidity in the vertical direction and are interconnected to provide a laterally rigid structure, as noted above.

As described above, vertical motion of the arm 12 in the direction of arrow 28 produces a twisting motion, or torsional motion, indicated by arrow 50 about the axis 27 of cantilever beam 16 (see FIG. 4). The beam has a high aspect ratio rectangular cross section, with a spring constant:

$$k_z = \frac{3EI}{L_c^3} = E\frac{ab^3}{4L_c^3} \quad \text{Eq. (1)}$$

where $I=ab^2/12$ is the second moment of area, a is the width of the beam, b is the height of the beam, and $L_c$ is the length of the moment arm 12 which produces the torsional force (see FIGS. 2 and 6). For a rectangular beam experiencing a torque T, the angle of rotation θ about its central axis (in the direction of arrows 50) is:

$$\theta = \frac{TL_T}{\beta Ga^3 b} \quad \text{Eq. (2)}$$

where $L_T$ is the length of the beam 16 between the mounting point 32 and the nearest support beam 79 which produces the torsional force; G is the shear modulus of rigidity of the material; and β is a coefficient determined by the aspect ratio b/a. For silicon(100), the shear modulus G is approximately $7.96 \times 10^{10}$ N/m². The following is a table of coefficients β for various aspect ratios of rectangular beams:

TABLE I

| b/a | 1 | 2 | 3 | 4 | 5 | 10 | ∞ |
|---|---|---|---|---|---|---|---|
| 1β | 0.1406 | 0.229 | 0.263 | 0.281 | 0.291 | 0.312 | 0.333 |

With the torsional cantilever illustrated in FIGS. 1 and 2, a force $F_z$ acting on the tip 23 in the direction 28 at a distance $L_c$ from the torsional support beam 16 produces a torque T defined as:

$$T = F_z L_c \quad \text{Eq. (3)}$$

The angle of rotation θ is the deflection ΔZ of the tip in the direction of arrow 28, divided by the length of the cantilever moment arm:

$$\theta = \frac{\Delta Z}{L_c} \quad \text{Eq. (4)}$$

Substituting equations 3 and 4 into equation 2, the effective spring constant $k^\theta_z$ of the torsional cantilever beam 16 is:

$$k_z^\theta = \frac{F_z}{\Delta Z} = 2\beta Ga^3 \frac{b}{L_c^2 L_T} \quad \text{Eq. (5)}$$

the factor "2" being included because the specific beam structure 16 illustrated in FIG. 6 includes two axially aligned segments on opposite sides of the center of the beam where the torsional force is applied, both of which are, in effect, rectangular beams mounted as cantilevers to the side walls of mesas 19 and 20.

FIG. 7 illustrates the relationship of a range of effective spring constant values with cantilever length, as a function of the geometric variables a and $L_c$, with the dimension b held constant at 10 micrometers. Curves 105 through 108 represent values of beam width a equal to 1.5 micrometers, 1 micrometer, 0.5 micrometer and 0.25 micrometer, respectively, where the length of the beam $L_T$ is equal to 50 micrometers for curve 105 and 200 micrometers for the remaining curves. These curves indicate that torsional cantilevers fabricated using the SCREAM-I process will achieve spring constants between $10^{-3}$ and $10^{-7}$ N/m. It was found that because of the high aspect ratio (b/a) of the beams, they exhibit no curling or buckling.

The theoretical spring constants for a torsional cantilever are shown in the following table:

TABLE II

| Force | Deflection | Spring Constant | Ratio to $k^q_z$ |
|---|---|---|---|
| $F_x$ acting at tip | $\Delta x$ | $k_x = \dfrac{2Ea^3 b}{L_T^3}$ | $\dfrac{k_x}{k_z^\theta} = \dfrac{E}{\beta G}\left(\dfrac{L_C}{L_T}\right)^2$ |
| $F_y$ acting at tip | $\Delta y$ causing a twisting of angle $\phi$ | $k_y^\phi = 3E\dfrac{a^3 b}{L_C L_T^2}$ | $\dfrac{k_y^\phi}{k_z^\theta} = \dfrac{3E}{2\beta G}\left(\dfrac{L_C}{L_T}\right)$ |
| $F_z$ acting at center of mass | $\Delta z$ | $k_z = \dfrac{2Eab^3}{L_T^3}$ | $\dfrac{k_z}{k_z^\theta} = \dfrac{E}{\beta G}\left(\dfrac{b}{a}\right)^2\left(\dfrac{L_C}{L_T}\right)^2$ |
| $F_z$ acting at tip | $\Delta z$ causing a rotation of angle $\theta$ | $k_z^\theta = 2\beta G \dfrac{a^3 b}{L_C^2 L_T}$ | 1 |

The foregoing table also shows the ratio of the theoretical spring constants to the value $k^\theta_z$, where $\nu$ is the Poisson's ratio of the material, this ratio being equal to 0.28 for silicon(100). The force $F_x$ in the above table acts on the tip 23 in the x direction to cause a deflection along the x axis. Force $F_y$ acting at tip 23 produces a deflection in the y direction and a consequent in-plane twisting of the moment arm 12 about support beam 16 through an angle $\phi$, while force $F_z$ acting at tip 23 produces a deflection in the z direction to produce a rotation of angle $\theta$ at the support beam 16. When the force $F_z$ acts at the center of mass; i.e., is directed onto the top of beam 16, there will be a deflection of beam 16 equal to $\Delta z$. The spring constants of the cantilever structure 10 for these various forces are illustrated in the table. As long as the length $L_c$ of the cantilever arm 12 is longer than the length of the torsional supports $L_T$, all other spring constants of the torsional cantilever will be one or more orders of magnitude greater than $k^\theta_z$. Although the capacitor plates 46 and 54 are provided to sense relative motion in the z direction, it will be understood that additional capacitor plates or other sensors such as piezoresistors, mirrors, diodes or transistors may be provided to detect motion of the cantilever in various directions.

Torsional resonators fabricated using the SCREAM technique with $k^\theta_z$ equal to about 0.3 N/m have achieved Q values of $10^5$ in a vacuum. A model of the present invention was constructed in accordance with FIG. 1, with the beam width a equal to 1.5 micrometers, the beam height b equal to 12.3 micrometers, the distance $L_T$ equal to 50 micrometers and the distance $L_c$ equal to 950 micrometers. This structure produced a spring constant of $2.58 \times 10^{-2}$ N/m. Furthermore, the resonant frequency of the torsional cantilever was experimentally measured at 1.4 kHz. The torsional rigidity was then determined, using the following relationship:

$$f_r = \frac{1}{2\pi}\sqrt{(\kappa/I)} \qquad \text{Eq. (6)}$$

where $\kappa$ is the torsional rigidity and I is the moment of inertia. The known geometry of the device and the densities of the materials permit calculation of the rotational moment of inertia $I = 2.55 \times 10^{-16}$ kg m². The resulting torsional rigidity is $\kappa = 1.97 \times 10^{-8}$ N/m, which means that experimentally $k^\theta_z = \kappa/L_c^2 = 2.18 \times 10^{-2}$ N/m.

Figure 8:
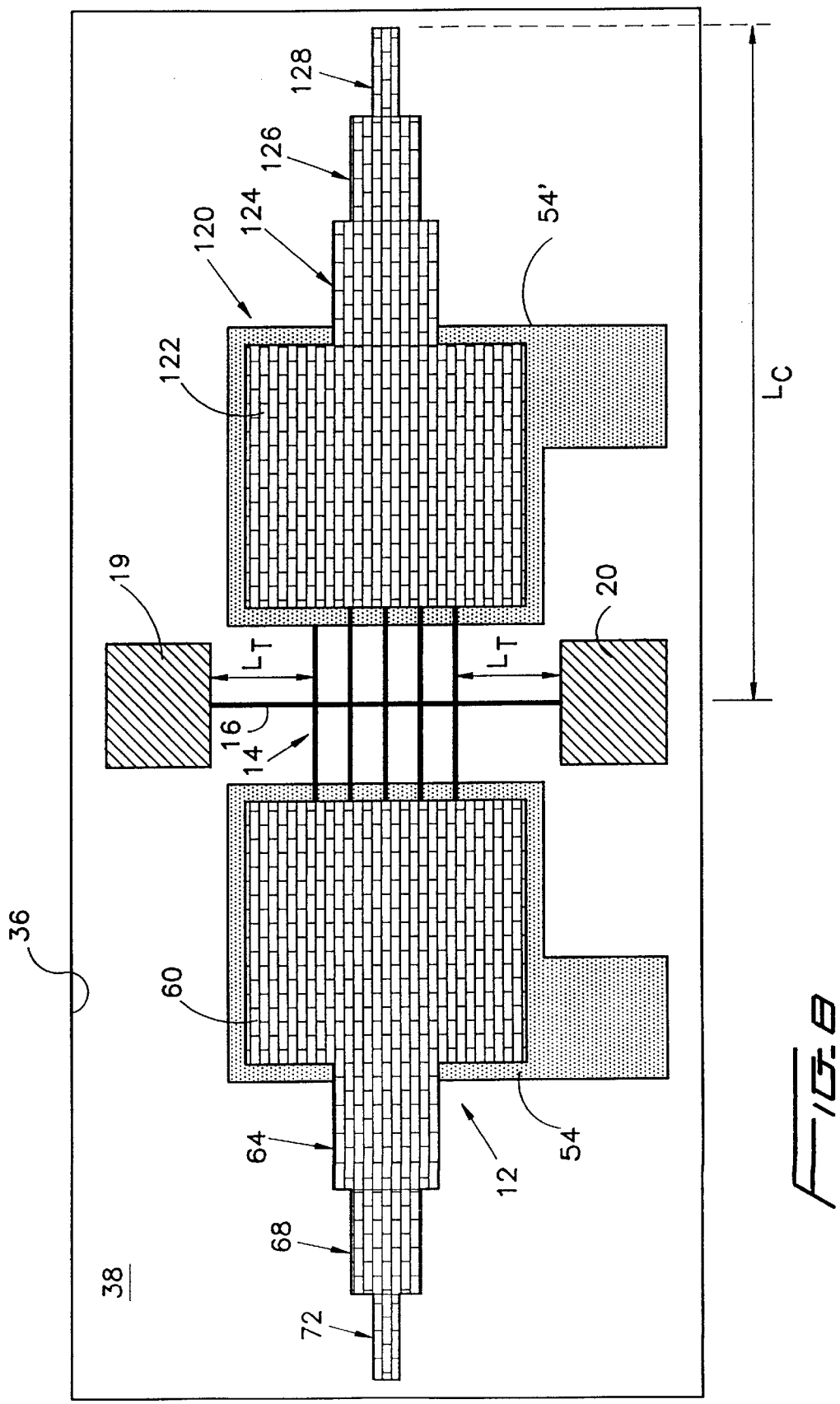
FIG. 8 is a top plan view of a second embodiment of the cantilever device of the present invention.

FIG. 8 illustrates a modification of the cantilever device of FIGS. 1 and 2, wherein the counterweight 26 is replaced by a second cantilever moment arm 120 which is a duplicate of moment arm 12 and is coplanar, but extending on the opposite side of support beam 16. The cantilever moment arm 120 includes segments 122, 124, 126, and 128 which correspond to segments 60, 64, 68, and 72 of moment arm 12, with the cantilever structure extending over electrode 54' on the floor 38 of cavity 34. The symmetric design of FIG. 8 provides improved results for applications such as in a scanning force microscope, since the moment arms of the two cantilevers about support beam 16 are more precisely balanced. However, the asymmetric design of FIGS. 1 and 2 may provide improved results for some sensor applications such as in an accelerometer. As with FIGS. 1 and 2, the electrodes 54 and 54' beneath the structure are used to move the cantilever or to detect motion, or both.

Figure 9:
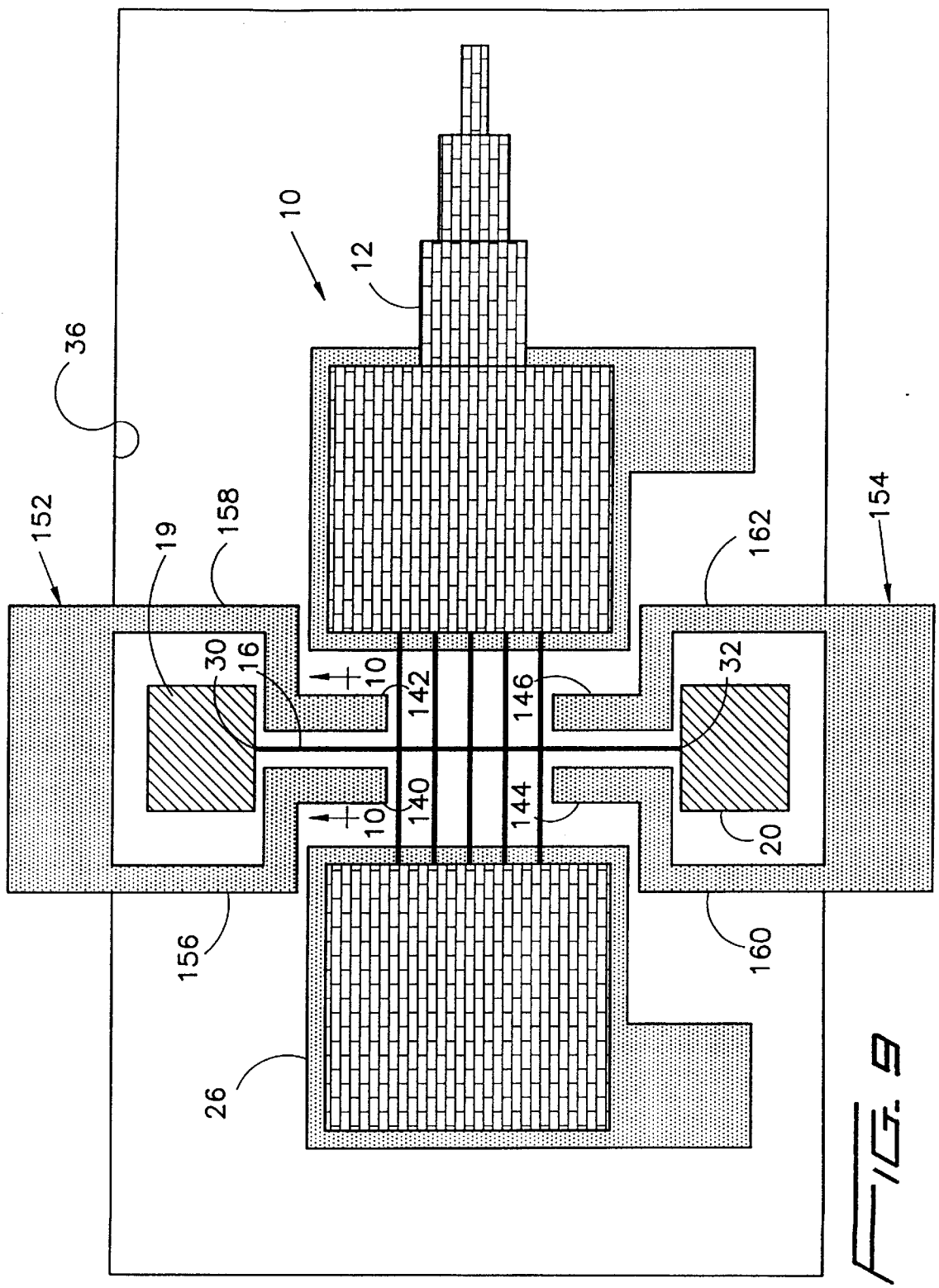
FIG. 9 is a top plan view of a third embodiment of the cantilever device of the present invention, utilizing torsion control electrodes.
Figure 10:
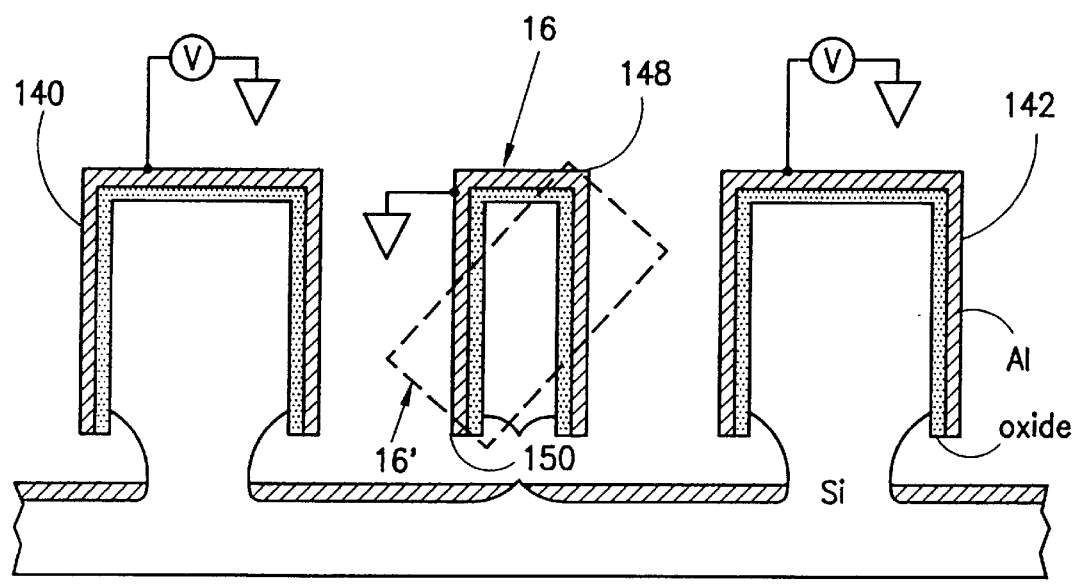
FIG. 10 is a cross-sectional view taken along lines 10—10 of FIG. 9.

A still further embodiment of the invention is illustrated in FIGS. 9 and 10, wherein the cantilever device 10 of FIGS. 1 and 2 is provided with electrodes adjacent the torsional support beam 16 for controlling twisting of the beam under the torsional forces applied by the cantilever arm 12 and the counterweight 26. In this illustration, the position of the arm 12 and counterweight 26 are reversed. As illustrated, a first pair of electrodes 140, 142 is placed adjacent end 30 of beam 16 while a second pair of electrodes 144, 146 is placed adjacent end 32 of beam 16. As the support beam 16 is twisted under a torsional force, as illustrated in dotted lines at 16' in FIG. 10, the upper edge 148 of beam 16 will approach electrode 142 and the lower edge 150 will approach electrode 140. A voltage applied to the electrodes 140 and 142, such as the voltage V relative to the voltage on beam 16, will attract the respective edges 148 and 150 of beam 16, causing the beam to twist further, so that the applied voltage will affect the spring constant of the cantilever.

It will be understood that the voltage may be applied to the electrodes 140, 142 and 144, 146 by way of integrated circuits fabricated on the substrate 18, such as circuits generally indicated at 152 and 154 in FIG. 9, connected by way of conductors 156, 158, and 160, 162, respectively. These electrodes and conductors may be fabricated in accordance with the SCREAM-I process described above.

Figure 11:
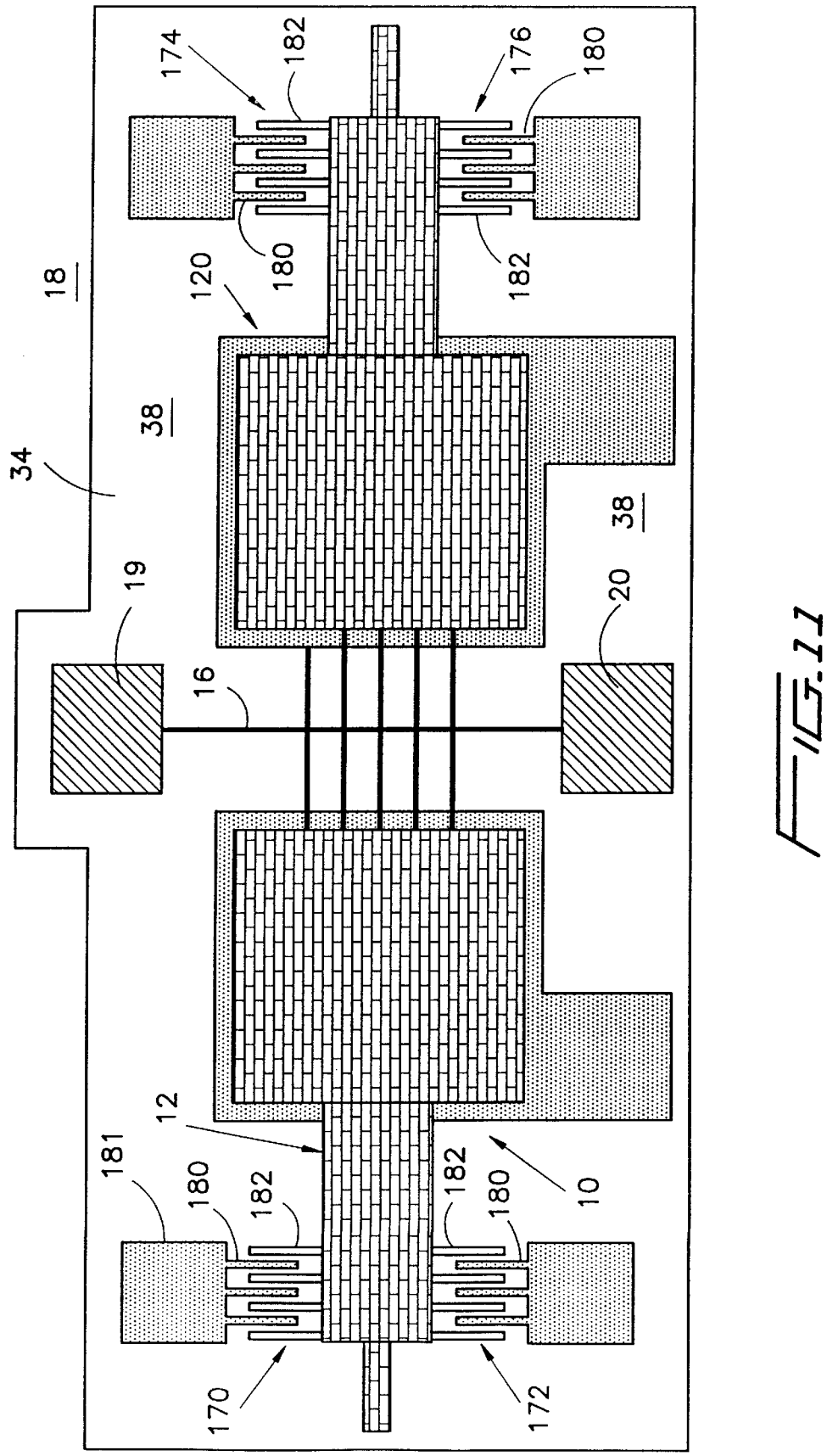
FIG. 11 is a fourth embodiment of the cantilever device of the present invention, utilizing comb-type capacitors for motion sensing and compensation.

It has been found that the planar configuration of the cantilever moment arms 12 and 120 illustrated in the preceding figures may be subject to some in-plane twisting. In order to sense such twisting, a plurality of comb-type capacitor electrode sets 170, 172, 174 and 176 may be provided, as illustrated in FIG. 11. Each of the electrode sets, such as set 170, may include a plurality of stationary finger electrodes 180 mounted in cantilever fashion to a mesa 181 on the substrate within the cavity 34, which contains the cantilever moment arms 12 and 120. Alternatively, the stationary electrodes 180 may be in the form of mesas, or islands, extending upwardly from the floor 38 of cavity 34. Corresponding interleaved finger electrodes 182 are mounted on the cantilever moment arm 12 for motion with the cantilever arm and with respect to the stationary electrodes 180. The interleaved electrode fingers form capacitors which may be used to sense the motion of the cantilever arms 12 and 120, both within the plane of the cantilevers and out of the plane of the cantilevers. Further, upon application of suitable voltages; for example, through an active feedback circuit (not shown) on substrate 18, motion of the cantilevers can be damped or enhanced to compensate for the twisting of the support beam 16. The comb-type capacitor sets 172, 174, and 176 are similar to set 170.

Figure 12:
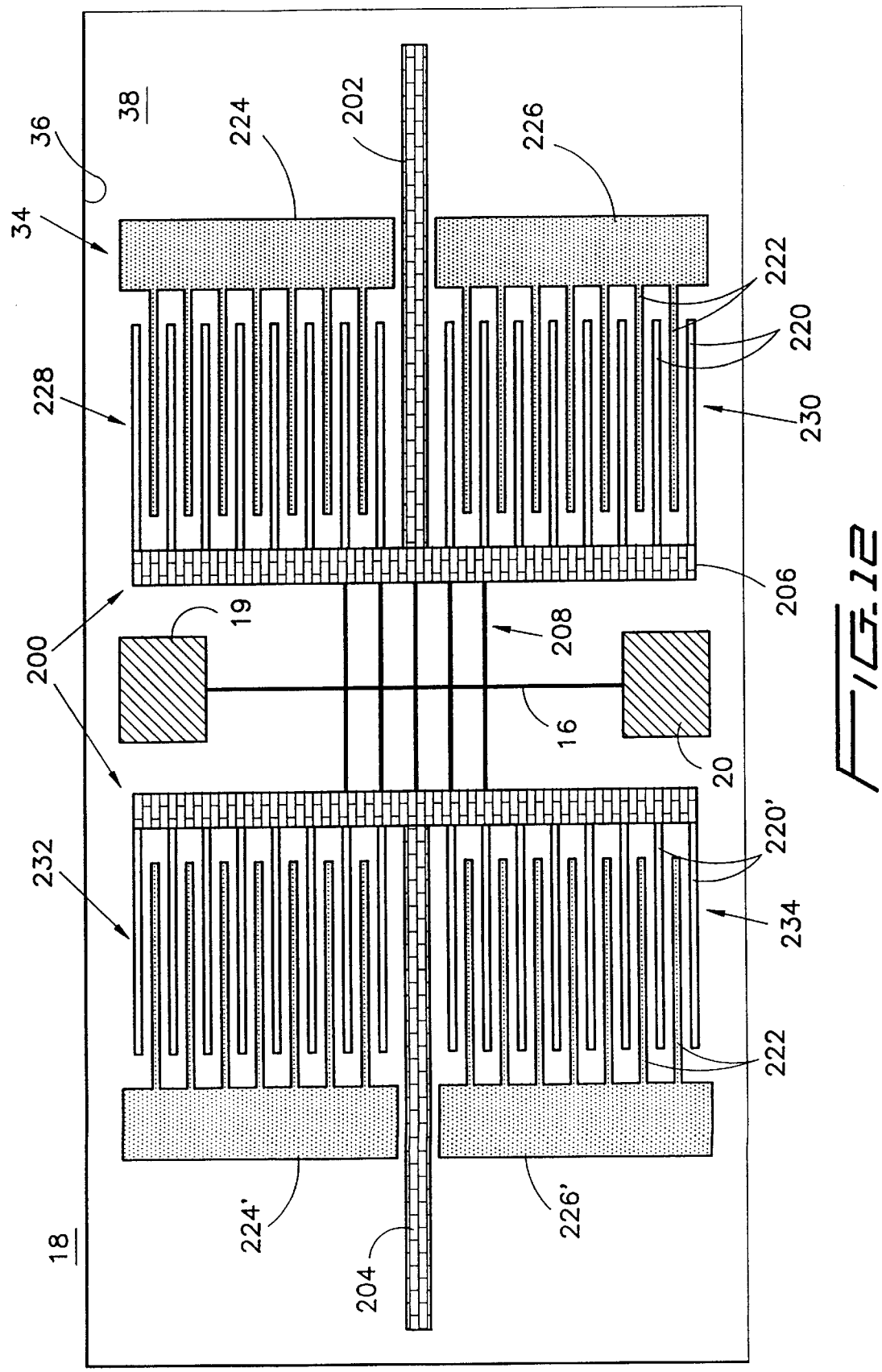
FIG. 12 is a fifth embodiment of the device of the present invention, utilizing comb-type capacitors.

A still further embodiment of the invention is illustrated in FIG. 12, wherein the electrodes mounted on the floor of the cavity 34 in which the cantilever structure 10 is located are omitted, and in their place are provided comb-type capacitors interacting with the cantilever moment arms. In this embodiment, a comb-type torsional cantilever device 200 is fabricated within cavity 34 in substrate 18, again using the SCREAM-I process described above. The cantilever device 200 is mounted on a torsional support beam 16 which preferably is integral with the substrate 18 and is mounted on mesas 19 and 20 in cavity 34, in the manner described above with respect to the device of FIG. 1, for example. The cantilever device 200 includes a pair of elongated moment arms 202 and 204 which are spaced from, and are suspended above, the floor 38 of cavity 34 and are moveable in a direction perpendicular to the plane of the cantilever 200, as described above. The cantilevers 202 and 204 are mounted opposite sides of lateral torsional beam 16.

The cantilever moment arm 202 extends from a base region 206 which is mounted on beam support 16 by a plurality of connector beams 208. A plurality of longitudinally-extending, spaced parallel fingers 220 in the form of high aspect ratio beams extend from base region 206. The fingers 220 extend above, and are released from floor 38 and thus are movable with respect to it, are parallel to the longitudinal axis of the moment arm 202, and are coplanar with the moment arm.

Interleaved with the fingers 220 are a plurality of stationary fingers 222 which are mounted on mesas 224 and 226 in cavity 34. Fingers 222 extend in cantilever fashion parallel to, and between adjacent fingers 220 and are coplanar therewith. Alternatively, the stationary fingers 222 may be in the form of mesas upstanding from floor 38 of cavity 34 and extending between fingers 220.

For symmetry, two sets 228 and 230 of interleaved fingers are provided for moment arm 202. Two sets 232 and 234 of similarly interleaved fingers are provided for moment arm 204. The interleaved fingers are fabricated with metal layers to provide capacitor electrodes which are connected to external circuity by way of mesas 19 and 20 for the movable electrodes and by way of mesas 224, 226 and 224' and 226' for the stationary electrodes. Relative motion of capacitor electrodes 220 and 220' with respect to the stationary capacitor electrodes 222 and 222' respectively, can be measured to detect vertical motion of a tip mounted on either of the cantilever arms 202 and 204, in the manner described above. Similarly, by selectively applying voltages between adjacent electrodes, the arms 202 and 204 can be moved, or their response characteristics varied.

Figure 13:
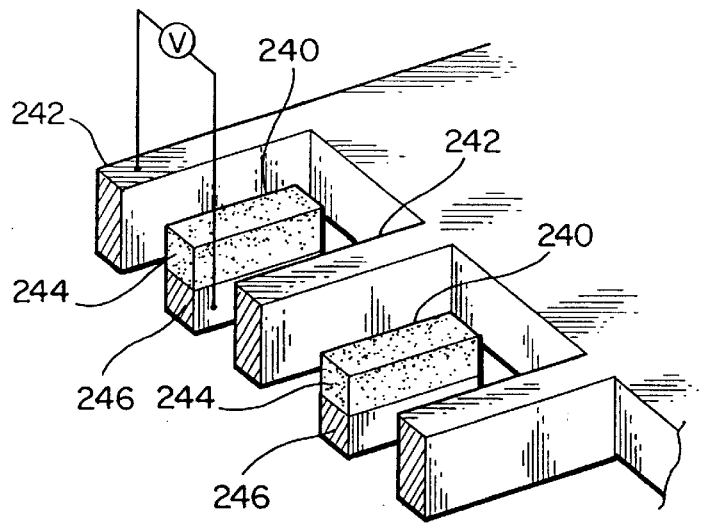
FIG. 13 is a partial, enlarged perspective view of a modified comb capacitor for the device of FIG. 12.
Figure 14:
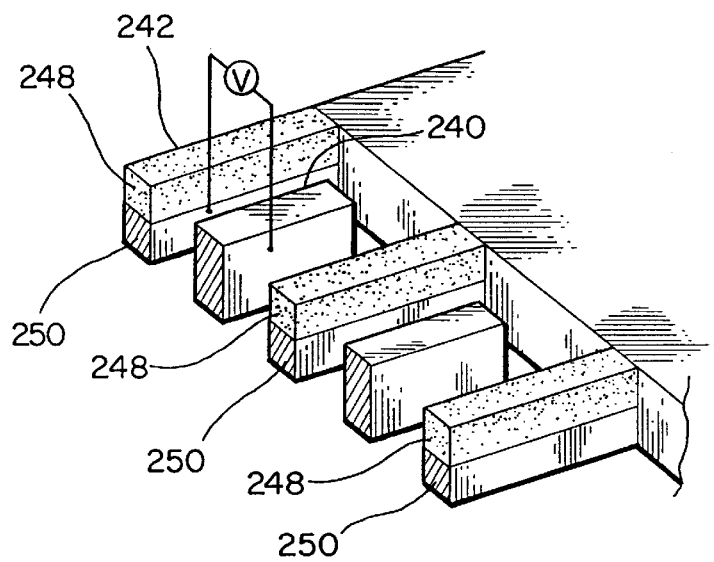
FIG. 14 illustrates a first alternative version of the comb capacitor of FIG. 13.
Figure 15:
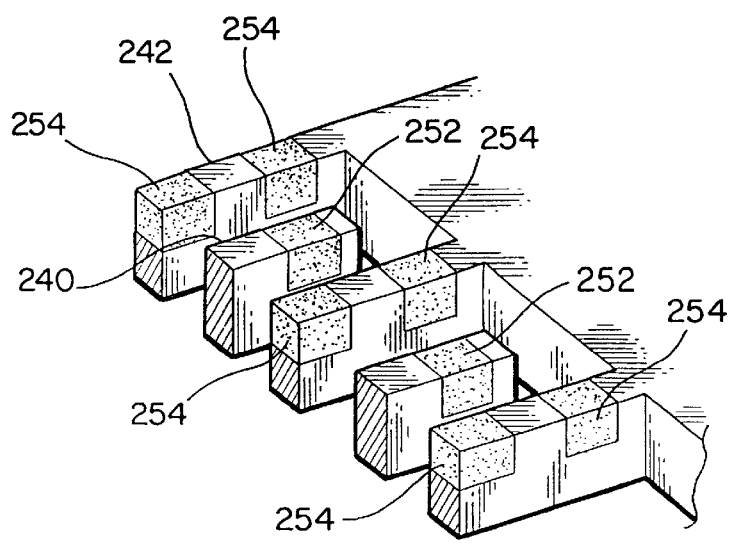
FIG. 15 illustrates a second alternative version of the comb capacitor of FIG. 13.

Modifications of the comb-type drive of FIGS. 11 and 12 are illustrated in FIGS. 13–15, wherein the moveable and fixed interleaved fingers 240 and 242, which correspond to fingers 220 and 222 in FIG. 12, are fabricated by the process of copending application Ser. No. 08/383,524, now U.S. Pat. No. 5,628,917 described above. This process permits fabrication of partially oxidized released silicon fingers, such as partially oxidized fingers 240 in FIG. 13, having their upper portions 244 oxidized, with the lower portions 246 remaining silicon. Alternatively, as illustrated in FIG. 14, the upper portions 248 of the fixed silicon fingers 242 can be oxidized, with the lower portions 250 remaining silicon. A voltage V may be applied across the silicon portions of the adjacent fingers to produce an asymmetric electric field between them which will result in relative motion of the fingers. Application of a negative voltage to the stationary fingers 242 and a positive voltage to fingers 240 in FIG. 13 will result in an upward force on the movable fingers, while the same polarities applied to the device of FIG. 14 will result in a downward force on the movable fingers. In FIG. 15, the fingers are provided with alternating oxidized and non-oxidized segments, the movable silicon fingers 240 including oxidized (silicon dioxide) segments 252, and the fixed silicon fingers 242 including oxidized (silicon dioxide) segments 254. The oxidized segments on each finger are aligned with non-oxidized segments on adjacent fingers, so that by controlling the voltages applied to the individual fingers, either upward or downward motion of the movable fingers can be achieved.

Figure 16:
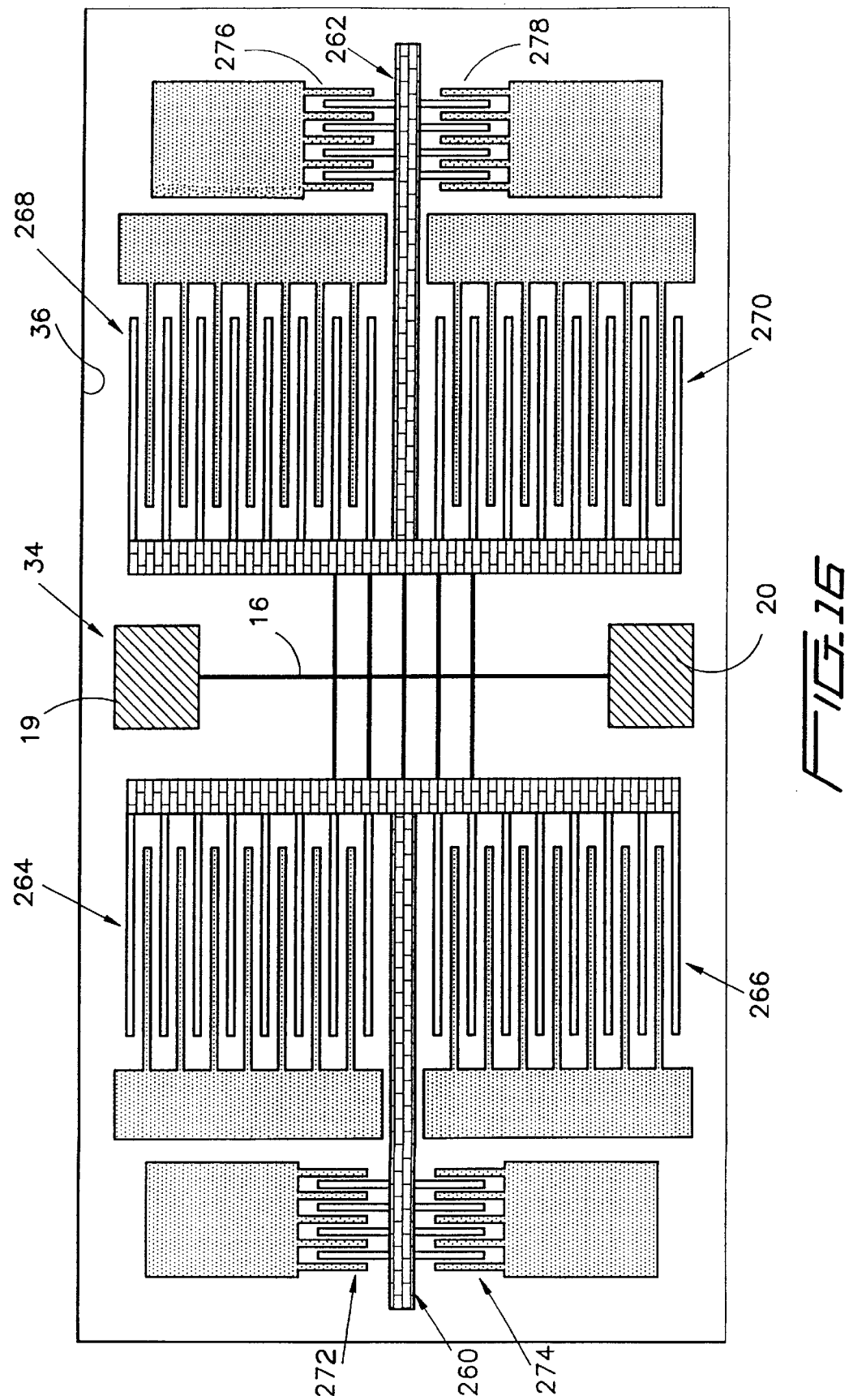
FIG. 16 is a sixth embodiment of the device of the present invention, combining the features of FIGS. 9 and 10.

FIG. 16 illustrates another embodiment of the invention wherein two cantilever moment arms 260 and 262 are mounted within the cavity 34 in substrate 18, in the manner described above. In this embodiment, cantilever arms 260 and 262 both incorporate interleaved sets of capacitor plates of the type illustrated in FIG. 12, cantilever arm 260 including capacitors sets 264 and 266, and cantilever arm 262 incorporating capacitor sets 268 and 270 in place of the underlying electrodes utilized in previous embodiments. These electrode sets are used to sense the vertical motion of the cantilever arms 260 and 262 in the manner previously described. In addition, the device of FIG. 16 incorporates sets of stabilizing comb capacitors to prevent or to compensate for in-plane twisting, cantilever arm 260 utilizing stabilizing capacitor sets 272 and 274, and cantilever arm 262 utilizing stabilizer capacitor sets 276 and 278.

Figure 17:
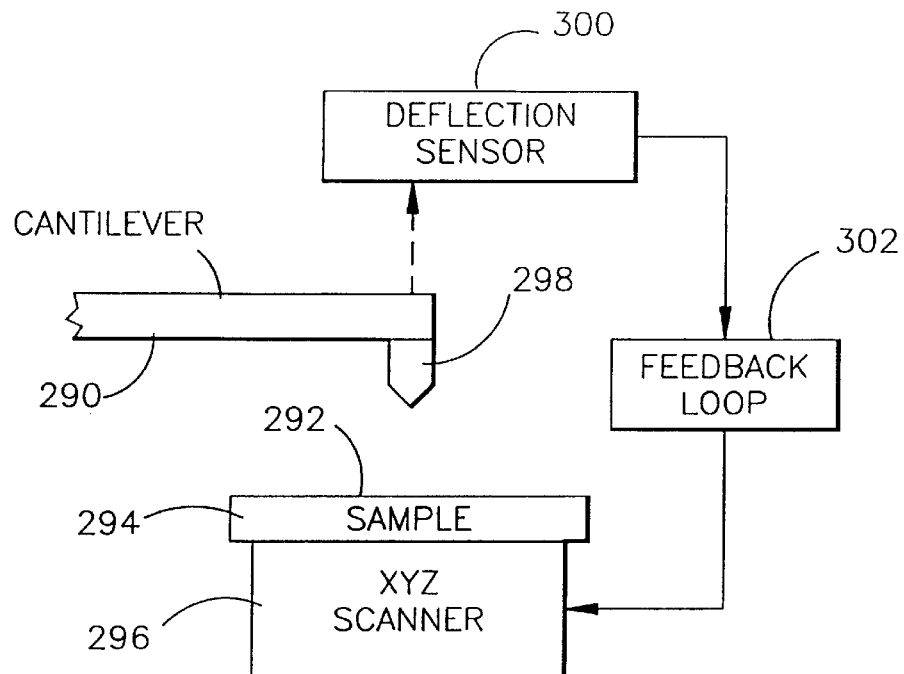
FIG. 17 is a diagrammatic illustration of the use of the torsional cantilever device of the present invention in an atomic force microscope.

FIG. 17 is a diagrammatic illustration of one use of the torsionally-mounted cantilever device of the invention in an atomic force microscope. As illustrated, the cantilever device 290, which may be any one of the cantilever devices described above, is mounted adjacent to the surface 292 of a sample 294 that is to be scanned. The sample is mounted on a scanning table 296 which may be driven, as by conventional piezoelectric electric drivers, in an XY plane beneath and parallel to the cantilever 290. The sample should also be adjustable in the Z direction to move it into proximity with a sensor tip 298 carried by the cantilever. When the tip is positioned very close to the surface of sample 294, the tip will interact with the material of the surface to produce deflection of the cantilever 290, as is known in the art of atomic force microscopes. The deflection of the cantilever may be detected by sensor 300 which produces an output signal through a feedback loop 302 to control the operation of the scanner 296. The cantilever of the present invention is extremely sensitive and thus allows measurements of extremely small forces with great accuracy.

Figure 18:
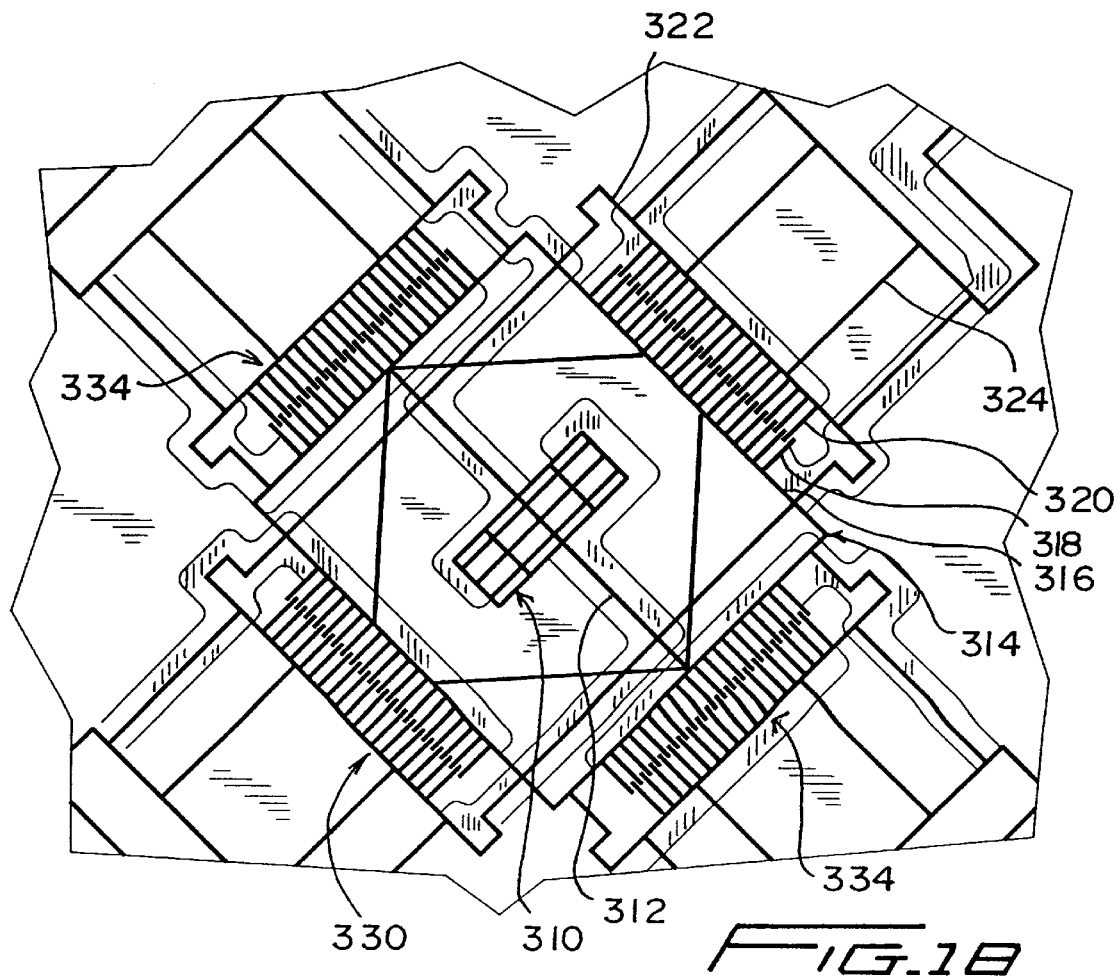
FIG. 18 is a photomicrograph of the torsional cantilever device of the present invention incorporated in an capacitor-driven xy stage configuration.

Instead of mounting the sample for motion, or in addition to doing so, the cantilever device itself can be mounted for motion in an XY plane, with the torsional movement of the cantilever producing motion in the Z direction. Such an xy mounting is illustrated in the photomicrograph of FIG. 18 to which reference is now made. In this embodiment, a cantilever structure 310 is mounted on a torsional support beam 312 in the manner described above. The outer ends of beam 312 are mounted on a movable frame 314 which is generally rectangular, having four sides, with each side carrying a set of moveable comb-capacitor fingers. Thus, for example, frame side 316 carries capacitor fingers 318.

Stationary capacitor fingers, such as the fingers 320 are mounted on an outer frame 322 and are interleaved with fingers 318. The outer frame number 322 is secured by spring arms 324 to a substrate so that upon energization of the capacitors made up of interleaved fingers 318 and 320, the frame 314, and thus the torsional cantilever device 310, will be moved along the longitudinal axis of cantilever 310, in a direction perpendicular to support beam 312. In similar manner, capacitor set 330 also moves the cantilever device along its longitudinal axis, which may be referred to as the X axis of the device.

Capacitor sets 332 and 334 are located on opposite sides of frame 314 at the ends of the beam 312, and when energized tend to move the frame 314 along the axis of beam 312, which may be referred to as the Y direction. Torsional motion of cantilever 310 about beam 312 provides motion of the sensor tips carried by the cantilever in a direction perpendicular to the XY plane to provide Z-direction motion of the tip.

Figure 19:
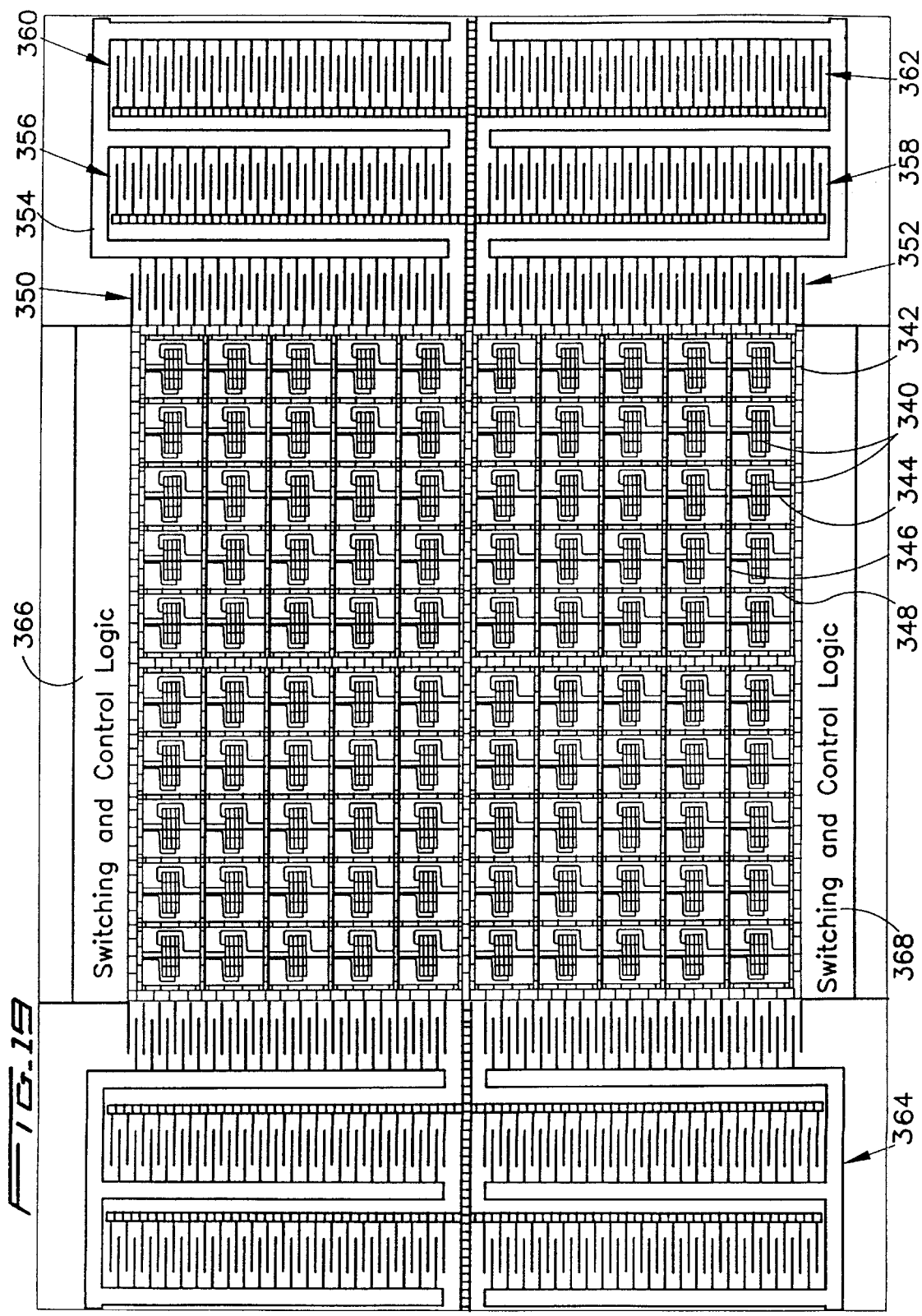
FIG. 19 is a diagrammatic illustration of an array of cantilevered sensors mounted for motion in an xy plane, with individual cantilevers being movable in the z direction.

Although FIG. 18 illustrates just a single cantilever mounted within a frame movable in the X and Y directions, the structure can be expanded to provide an array of cantilevers, in the manner illustrated in FIG. 19. As there illustrated, a 10×10 array of torsional cantilevers 340 are mounted in a 1 millimeter by 1 millimeter square frame 342, with the cantilevers being spaced at 100 micrometer intervals. Each cantilever is mounted on a torsional beam, such as beam 344 of cantilever 340, between parallel frame elements such as the frame elements 346 which are parallel to the X axis of the array. The individual cantilever arms are located between spaced, parallel Y-axis frame elements such as elements 348. The entire structure is fabricated by the SCREAM process described above, and is released from the underlying substrate is mounted on the substrate for motion in the x-y plane. Suitable spring arms such as those described above with respect to FIG. 18 may be provided to secure the structure to the substrate.

On each of the sides of frame 342 are one or more comb capacitor frame driver sets such as those illustrated at 350 and 352, each of which contains movable capacitor fingers connected to movable frame 342 and stationary capacitor fingers mounted on a stationary frame or substrate 354. If desired, frame 354 may carry multiple sets of stationary comb capacitor fingers which engage corresponding fingers carried by extensions of frame 342. Thus, for example, the stationary frame 354 and the movable frame 342 may carry comb capacitor driver sets 356, 358, 360 and 362. These additional sets of comb capacitors increase the distance which the frame 342 can be moved in the X-axis direction and increase the precision of operation so that the cantilevers 340 can be precisely positioned. Similar comb capacitor drivers are provided at each of the four sides of the array, the driver sets indicated at 364 cooperating to provide motion on the X-axis with similar structures (not shown) on the remaining two sides of the array providing motion in the Y axis.

Each of the sensor tips on the individual cantilevers 340 are connected to suitable switching and control logic circuits, illustrated generally at 366 and 368. The connections are by way of the frame elements 346 and 348 in the manner described with respect to the movable stage device described in U.S. Pat. No. 5,506,175 of Zhang et al. As there described, the frame elements are constructed of multiple interconnected parallel beams with oxidized segments at selected locations to provide electrical paths between the switching and control circuits 366 and 368 and control capacitors and sensors for corresponding individual cantilevers.

A major advantage of the array of FIG. 19 is that an area 1 mm×1 mm can be scanned by moving individual tips only 100 micrometers along their x and y axis. This allows very rapid scanning of a large area without the need for large scale motion.

Figure 20:
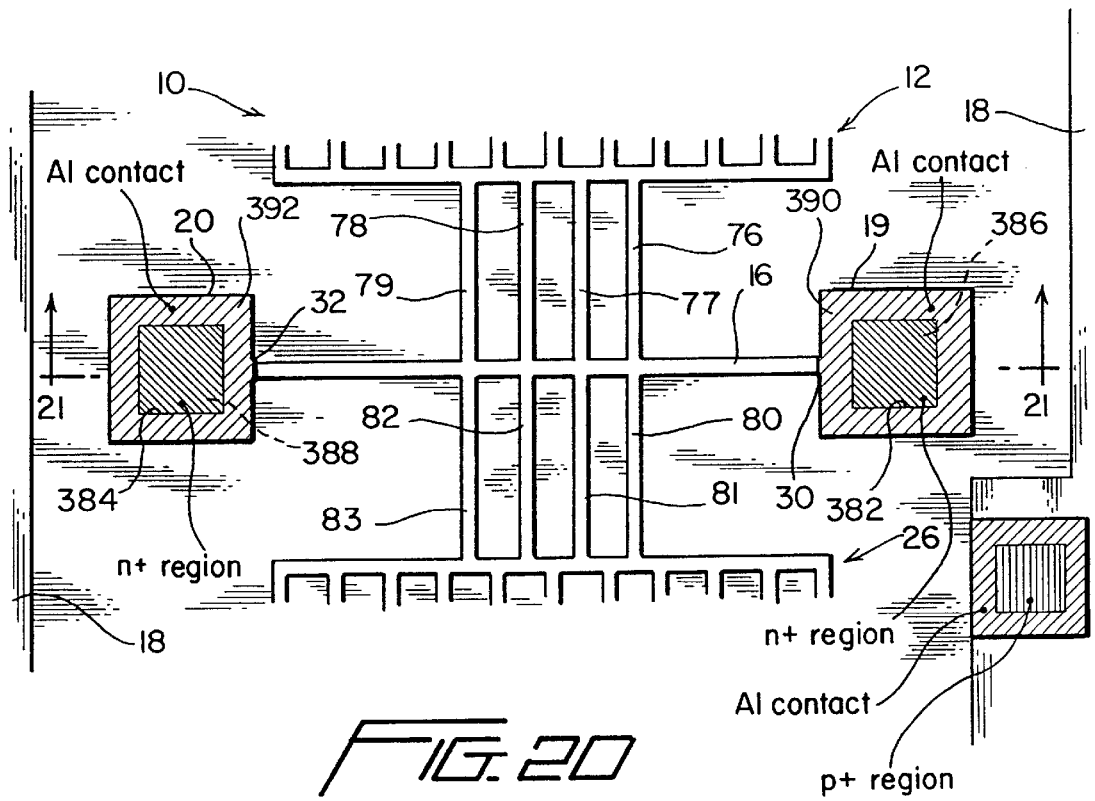
FIG. 20 is an enlarged, partial top plan view of a torsional cantilever device incorporating piezoresistive sensors.
Figure 21:
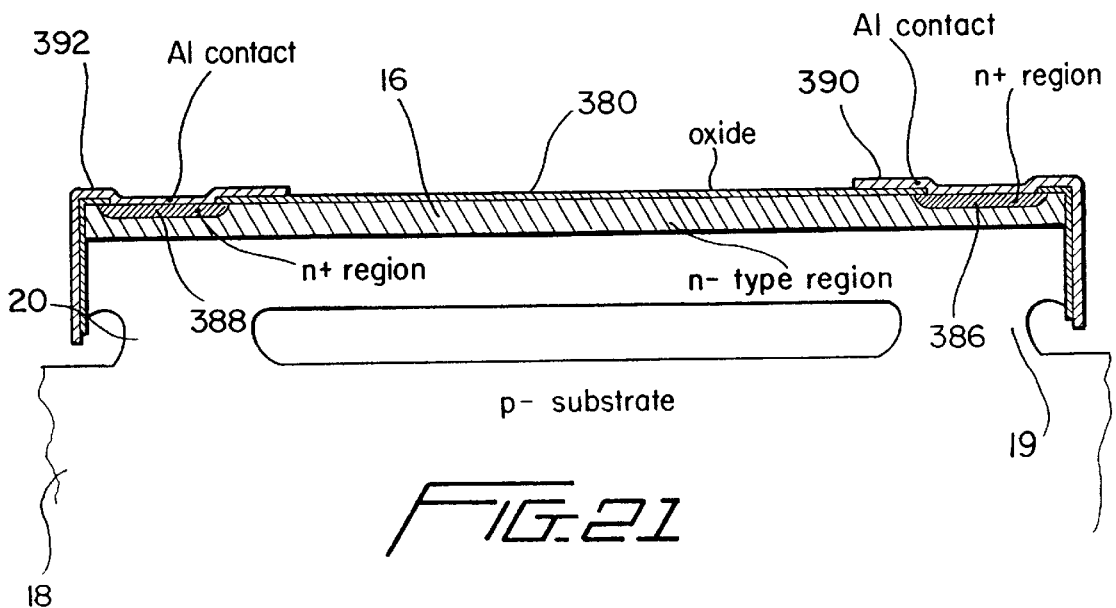
FIG. 21 is a cross-section along lines 21—21 of FIG. 20.

Although the various capacitor structures described above may be used for sensing the movement of the cantilever device of the present invention, a piezoresistor sensor may be utilized in place of, or in addition to such capacitor sensors, if desired. FIGS. 20 and 21 illustrate such piezoresistor sensors for the cantilever arm 12 of FIG. 1, although it will be apparent that similar sensors may be used for any of the torsional cantilever devices described above. Accordingly, in FIG. 20, the moment arm 12 is shown as connected to the torsional support beam 26 by connector beams 76–79 and the counterbalance 26 is shown as being connected to the beam 16 by connectors 80–83, all as described with respect to FIG. 1. The beam 16 is connected at its ends 30 and 32 to mesas 19 and 20, respectively.

In accordance with this embodiment of the invention, a piezoresistor sensor is built into the torsional support beam to measure the deflection of the cantilever. The piezoresistive effect is the change in resistance of a conductor when it is subjected to a mechanical strain, and in this case, the resistor is defined by implanting an n-type region into a p-type substrate (or in the alternative, by implanting a p-type region into an n-type substrate) in the region of the beam 16 and mesas 19 and 20 prior to fabrication of the cantilever device. The device is then fabricated using the SCREAM-1 process, as described above, with the torsional support beam 16 located in the implanted region. The top surface of the beam and the mesas is covered with an oxide layer 380, and vias 382 and 384 are opened through the oxide layer to expose the surface of the n-type substrate silicon on the mesas 19 and 20, respectively. Another implant through these vias then defines highly doped regions 386 and 388 to provide contact areas. Aluminum is then sputtered on to the structure and patterned to provide aluminum contacts 390 and 392, in the vias, and these contacts are then connected to external circuitry, as by way of wires (not shown) bonded to the aluminum contact 390 and 392 and to corresponding contacts on sensor circuitry located on the adjacent substrate. The beam 16 then acts as a resistor connected between the contacts 390 and 392.

When a force interacts with the torsional cantilever, a torque is generated about the central axis of the torsional support beam 16. The stress in the beam produces a change in its resistance, and this change can be detected by incorporating the beam resistor in a Wheatstone bridge in the circuitry carried on the substrate. The measured resistance change can be directly related to the amount of deflection of the cantilever, and thus to the force which generated the torque.

Figure 22:
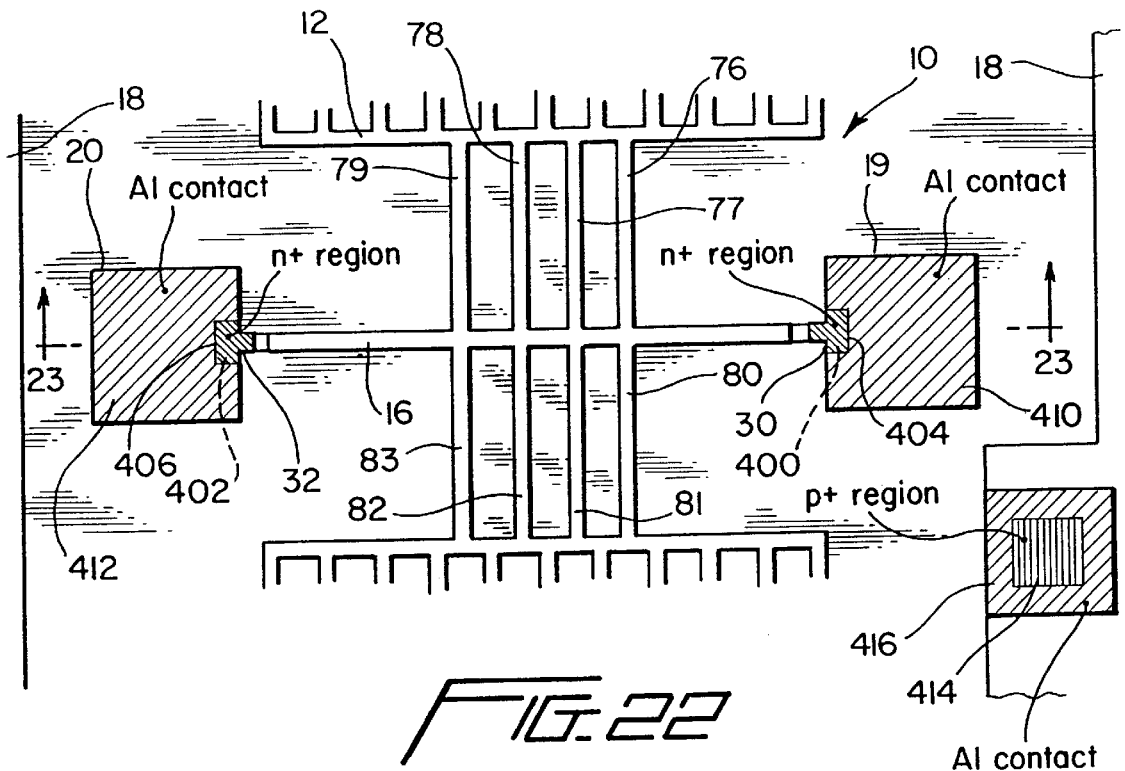
FIG. 22 is an enlarged, partial top plan view of a torsional cantilever device incorporating diode sensors.
Figure 23:
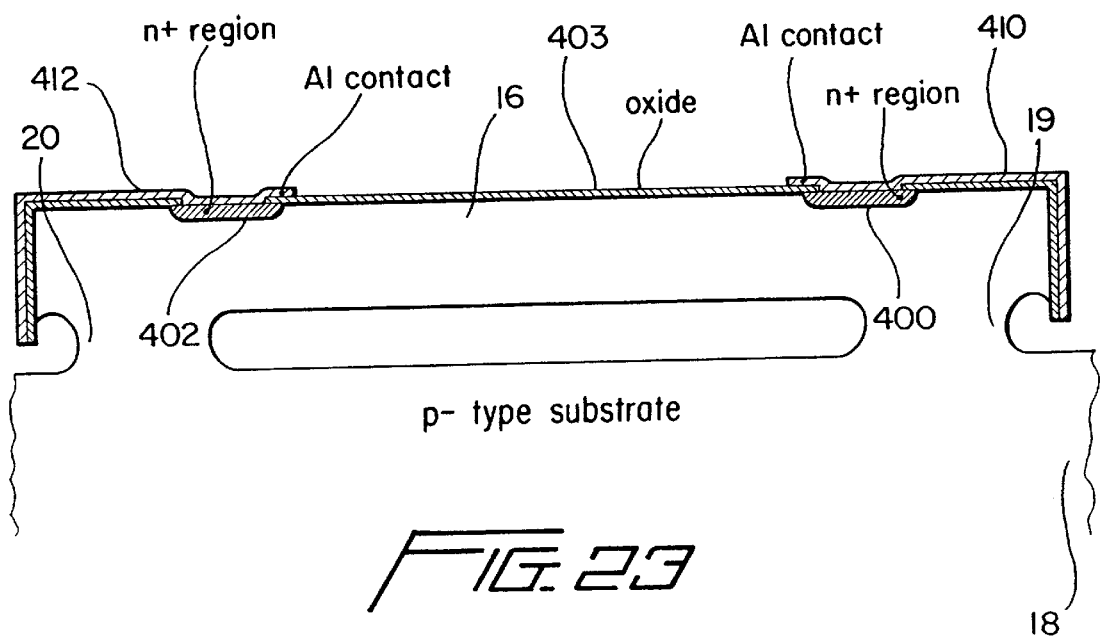
FIG. 23 is a cross-sectional view taken along lines 23—23 of FIG. 22.

Another stress-sensitive sensor, which is based on the piezojunction effect, is illustrated in FIGS. 22 and 23. When silicon devices such as diodes and transistors are subjected to stress, the characteristics of these devices are affected; more particularly, when stresses are applied to a pn junction, the band gap of the junction decreases and the diffusion length increases. This increases the saturation current and leads to a higher forward current for the same forward bias voltage. In the embodiment illustrated in FIGS. 22 and 23, advantage is taken of this effect by incorporating a diode into the torsional support beam 16 of the torsional cantilever device 10 of FIG. 1. The deflection of the cantilever is then monitored by the change in the current of the diode.

In FIGS. 22 and 23, a pair of sensor diodes are formed by implanting n+ regions, such as regions 400 and 402, in a p-substrate silicon at the junctions 30 and 32 of the torsional support beam 16 with fixed mesas 19 and 20. Alternatively, a p+-type regions may be implanted into an n-type substrate silicon. After formation of the beam 16 and the mesas 19 and 20 using the SCREAM-1 process described above, vias 404 and 406 are opened in the top oxide layer 408 of beam 16 and mesas 19 and 20 to permit contact to be made to the implanted region. This contact is obtained by sputtering of aluminum at 410 and 412 on the mesas and over the doped regions exposed by the vias 404 and 406.

A second contact to the diode is by way of a p+ region 414 and an aluminum contact 416 located on the adjacent substrate 18 at a location near to the mesas 19 and 20. As illustrated in FIGS. 20 and 21, the two diodes are located at the junctions of the torsional support beam 16 with the fixed support for the beam. When a force interacts with the torsional cantilever, a torque is generated about the central axis of the torsional support beam 16. The stress in the beam is maximized at the junctions 30 and 32, and this stress acts on the diodes to cause a change in the current in each diode. The measured current change can be directly related to the amount of deflection of the cantilever, and subsequently to the force which generated the torque. The aluminum contacts are connected as by wire leads bonded to the contacts, to corresponding contacts in adjacent circuits to provide the requisite measurements.

Although the present invention has been described in terms of numerous embodiments, it will be apparent that variations and modifications may be made without departing from the true spirit and scope thereof as set forth in the following claims.

What is claimed is:

1. A compact, low mass force detector, comprising:
    a microfabricated support beam having first and second ends mounted to a substrate;
    a moment arm extending from said support beam, said moment arm and said support beam being generally perpendicular to each other and coplanar, said moment arm being comprised of a rigid grid of microfabricated beams and being responsive to a force applied thereto to produce a corresponding torsional force on said support beam;
    motion control means for said moment arm; and
    means for measuring said force applied to said moment arm.

2. The detector of claim 1, further including a nanometer-scale sensing tip carried by said moment arm.

3. The detector of claim 2, further including a frame supporting said support beam in said substrate for motion in X and Y directions in the plane of said moment arm and support beam, said moment arm being movable in a Z direction out of said plane to produce said torsional force on said support beam, whereby said tip is movable in said X,Y and Z directions.

4. The detector of claim 3, wherein said frame supports a multiplicity of said moment arms and corresponding support beams to provide an array of tips.

5. The detector of claim 2, wherein said moment arm is symmetrical with respect to said support beam and said tip is offset from said support beam to provide a high degree of sensitivity to a force applied to said tip.

6. The detector of claim 2, wherein said moment arm is asymmetrical with respect to said support beam to provide a high degree of sensitivity to a force applied to said moment arm.

7. The detector of claim 2, wherein said motion control means is located to apply a force to said moment arm which urges said tip out of said plane to enable said tip to track a sample surface.

8. The detector of claim 1, wherein said means for measuring said force applied to said moment arm comprises means for measuring torsional stress in said support beam.

9. The detector of claim 8, wherein said means for measuring stress comprises a piezoresistor in said support beam.

10. The detector of claim 8, wherein said means for measuring stress comprises a diode in said support beam.

11. The detector of claim 8, wherein said means for measuring stress comprises a transistor.

12. The detector of claim 1, wherein said microfabricated beams in said grid have high aspect ratios to resist bending motion in a direction out of said plane, said rigid grid resisting bending motion in said plane, whereby force applied to said moment arm produces said torsional stress in said support beam.

13. The detector of claim 1, further including a counter-balance extending from said support beam to produce a torsional force on said support beam which is opposed to the torsional force produced by said moment arm.

14. The detector of claim 13, wherein said support beam, moment arm and counterbalance are a unitary structure.

15. The detector of claim 13, wherein said motion control means comprises a metal layer on said moment arm and on said counterweight, and a stationary electrode adjacent each of said moment arm and said counterweight.

16. The detector of claim 15, wherein said metal layer and said stationary electrode form comb-type capacitive elements.

17. A force sensor, comprising:
    a single-crystal silicon substrate;
    a torsionally-mounted cantilever including a moment arm and a support beam formed from said substrate and integral therewith, said cantilever moment arm being moved about said support beam with respect to said substrate in response to a force to be measured; and
    detector means including plural stationary electrode fingers on said substrate capacitively coupled to plural movable electrode fingers on said moment arm and interleaved with said stationary fingers for detecting motion of said moment arm.

18. The force sensor of claim 17, wherein said cantilever has a predetermined spring constant, and further including a capacitor adjacent said support beam for adjusting said spring constant.

19. The force sensor of claim 17, wherein said cantilever has a predetermined spring constant and further including means for adjusting said spring constant.

20. The force sensor of claim 17, wherein said capacitor fingers comprise partially oxidized single crystal silicon.

21. The force sensor of claim 20, wherein each of said capacitor fingers includes plural spaced partially oxidized segments located in alignment with corresponding nonoxidized segments in an adjacent finger.

22. The force sensor of claim 17, further including an integral sensor tip on said moment arm.

23. A force sensor comprising:
    a single-crystal silicon substrate;
    a torsionally-mounted cantilever including a moment arm, a counterweight, and a support beam formed from and integral with said substrate, said moment arm and said counterweight being coplanar with, perpendicular to, and extend in opposite directions from said support beam, and are movable with respect to said substrate, said cantilever arm being movable with respect to said substrate in response to a force to be measured to twist said support beam and wherein said cantilever is fabricated from said substrate in the form of single crystal silicon beams having cross-sectional aspect ratios of about 10 to 1, to provide mechanical rigidity in the direction of forces applied to said moment arm; and detector means for detecting said motion.

24. The force sensor of claim 23, further including driver means for electrically controlling twisting of said support beam.

25. The force sensor of claim 24, wherein said driver means is a capacitor.

26. The force sensor of claim 23, further including driver means for electrically controlling motion of said moment arm.

27. The force sensor of claim 26, wherein said driver means is a comb capacitor.

28. A force sensor, comprising:
a single-crystal silicon substrate;
a movable frame carried by said substrate;
a torsionally-mounted cantilever including a moment arm and a support beam, said support beam including first and second ends secured to said frame, said cantilever moment arm being moved about said support beam with respect to said frame in response to a force to be measured; and
detector means for detecting motion of said moment arm.

29. The force sensor of claim 28, further including multiple support beams mounted on said frame, each of said support beams including a corresponding moment arm to form an array of cantilevers torsionally mounted within said frame.

30. The force sensor of claim 29, wherein each cantilever is mounted for independent motion with respect to said frame.

31. The force sensor of claim 28, wherein said detector means includes a piezoresistive sensor responsive to torsional forces applied to said support beam.

32. The force sensor of claim 28, wherein said detector means includes a pn junction responsive to torsional stress in said support beam.

33. The force sensor of claim 28, further including drive means for moving said movable frame in a plane, said cantilever moment arm being moved in a direction substantially perpendicular to said plane.

34. The force sensor of claim 28, wherein said support beam, said moment arm and said frame are coplanar, said moment arm being urged in a direction substantially perpendicular to said plane by a force to be measured.

35. The force sensor of claim 34, further including driving means for selectively moving said frame in said plane.

* * * * *